US008841620B2

(12) United States Patent  
Okada

(10) Patent No.: US 8,841,620 B2
(45) Date of Patent: Sep. 23, 2014

(54) RADIOGRAPHIC IMAGING DEVICE AND RADIOGRAPHIC IMAGING APPARATUS

(75) Inventor: Yoshihiro Okada, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 776 days.

(21) Appl. No.: 12/979,099

(22) Filed: Dec. 27, 2010

(65) Prior Publication Data

US 2011/0180717 A1     Jul. 28, 2011

(30) Foreign Application Priority Data

Jan. 28, 2010   (JP) ................................ 2010-016825
Jun. 30, 2010   (JP) ................................ 2010-150208

(51) Int. Cl.
    *G01T 1/20*     (2006.01)

(52) U.S. Cl.
    USPC .......................................................... 250/366

(58) Field of Classification Search
    USPC ........................................... 250/370.09, 366
    See application file for complete search history.

(56) References Cited

U.S. PATENT DOCUMENTS

| 6,380,528 | B1 * | 4/2002 | Pyyhtia et al. ............ 250/208.1 |
| 6,928,144 | B2 * | 8/2005 | Li et al. ...................... 378/98.8 |
| 7,223,981 | B1 * | 5/2007 | Capote et al. ............ 250/370.13 |
| 7,531,809 | B2 * | 5/2009 | Capote et al. ............ 250/370.13 |
| 7,608,832 | B2 * | 10/2009 | Okada ..................... 250/370.08 |
| 2002/0125438 | A1 * | 9/2002 | Pyyhtia et al. .......... 250/370.08 |
| 2003/0086523 | A1 | 5/2003 | Tashiro et al. |
| 2004/0041097 | A1 | 3/2004 | Ishii et al. |
| 2004/0149920 | A1 | 8/2004 | Ishii et al. |
| 2004/0156473 | A1 | 8/2004 | Nonaka et al. |
| 2005/0257932 | A1 * | 11/2005 | Davidson et al. ............ 166/304 |
| 2007/0176109 | A1 * | 8/2007 | Bell ....................... 250/370.09 |
| 2009/0084938 | A1 * | 4/2009 | Okada ....................... 250/208.1 |

FOREIGN PATENT DOCUMENTS

| JP | 2003087656 A | 3/2003 |
| JP | 2003126072 A | 5/2003 |
| JP | 2004-130058 A | 4/2004 |
| JP | 2004170216 A | 6/2004 |
| JP | 2004223157 A | 8/2004 |
| JP | 2004228516 A | 8/2004 |

OTHER PUBLICATIONS

Notice of Reasons for Rejection, date Jul. 23, 2013, issued in corresponding JP Application No. 2010-150208, 4 pages in English and Japanese.

(Continued)

*Primary Examiner* — David Porta
*Assistant Examiner* — Taeho Jo
(74) *Attorney, Agent, or Firm* — Sughrue Mion, PLLC

(57) ABSTRACT

The present invention provides a radiographic imaging device including: plural pixels disposed in a matrix, each pixel including a sensor section that generates charges based on irradiation of radiation, or on illumination of light that has been converted from radiation; plural scan lines through which a control signal flows for switching switch elements included in pixels that are employed as radiographic imaging pixels out of the plural pixels; plural signal lines through which electrical signal flow corresponding to the charge that has been accumulated in the radiographic imaging pixels according to the switching state of the switch elements; and one or more radiation detection line through which an electrical signal flows corresponding to the charge that has been generated in the sensor sections of the radiation detection pixels out of the plural pixels.

13 Claims, 17 Drawing Sheets

(56) References Cited

OTHER PUBLICATIONS

First Notification of Office Action, issued Dec. 4, 2013, in corresponding CN Application No. 201010598477.6, 28 pages in English and Chinese.

Notice of Reasons for Rejection, mailed Apr. 8, 2014, issued in corresponding JP Application No. 2010-150208, 2 pages in English and Japanese.

Chinese Office Action corresponding to Chinese Patent Application No. 201010598477.6, dated Jul. 14, 2014, 26 pages in Japanese and English.

* cited by examiner

RADIOGRAPHIC IMAGING DEVICE AND RADIOGRAPHIC IMAGING APPARATUS

CROSS-REFERENCE TO RELATED APPLICATION

This application claims priority under 35 USC 119 from Japanese Patent Application No. 2010-016825, filed on Jan. 28, 2010, and Japanese Patent Application No. 2010-150208, filed on Jun. 30, 2010, the disclosure of which are incorporated by reference herein.

BACKGROUND OF THE INVENTION

1. Field of the Invention

The present invention relates to a radiographic imaging device. The present invention in particular relates to a radiographic imaging device that has plural pixels disposed in a matrix, accumulates charge generated by radiation irradiation, and detects the accumulated charge amount as an image data. The present invention also relates to a radiographic imaging apparatus employing such a radiographic imaging device image a radiographic image.

2. Description of the Related Art

Recently, radiographic imaging devices have been put into practice employing a radiographic imaging device of a FPD (flat panel detector), or the like. Such radiographic imaging devices have an X-ray sensitive layer disposed on a TFT (Thin Film Transistor) active matrix substrate, and are able to directly convert X-ray information into digital data. Such FPDs have the merit that, in comparison to with previous imaging plates, images can be more immediately checked and video images can also be checked. Consequently the introduction of FPDs is proceeding rapidly.

Various types are proposed for such radiographic imaging devices. There are, for example, direct-conversion-type radiographic imaging devices that convert radiation directly to charge in a semiconductor layer, and accumulate the charge. There are also indirect-conversion-type radiographic imaging devices that first convert radiation into light with a scintillator, such as CsI:Tl, GOS ($Gd_2O_2S$:Tb) or the like, then convert the converted light into charge in a semiconductor layer and accumulate the charge.

A radiographic imaging apparatus is known that has a second photoelectric conversion element (a sensor for AEC control) disposed on the same substrate but independently to pixels having first conversion elements disposed in a conversion section on the substrate for outputting image data (see, for example, JP-A No. 2004-130058). The second photoelectric conversion element (AEC control sensor) is an element employed for detecting the total irradiated amount of radiation incident to the conversion section in order to perform Automatic Exposure Control (AEC). The second photoelectric conversion element is connected via a signal line to a second amplifier (AMP) of a processing circuit section for detecting the total irradiated amount of radiation incident on the conversion section.

However, in the radiographic imaging apparatus described in JP-A No. 2004-130058, the second photoelectric conversion element is disposed over a relatively large region in order to detect the radiation irradiation amount with precision. Namely, the second photoelectric conversion element needs to be made large in order to detect the radiation irradiation amount with precision. However, in cases where the second photoelectric conversion element is made large, the continuously disposed first conversion elements for detecting the image data can no longer be disposed in the region where the second photoelectric conversion element is disposed, or the pixel size of the first conversion elements becomes smaller. As a result, the image detection precision of the radiographic imaging apparatus is reduced.

SUMMARY OF THE INVENTION

The present invention provides a radiographic imaging device and radiographic imaging apparatus that maintain good detection precision of radiation by pixels employed for radiation detection, while maintaining good radiographic image quality acquired by pixels employed for radiographic image acquisition.

A first aspect of the present invention is a radiographic imaging device including: a plurality of pixels disposed in a matrix in a detection region for detecting radiation, each pixel comprising a sensor section that generates charges based on irradiation of radiation, or on illumination of light that has been converted from radiation; a plurality of scan lines through which a control signal flows for switching switch elements in order to read out the charges that has been generated in the sensor sections of each pixel, out of the plurality of pixels, that has been employed as a radiographic imaging pixel; a plurality of signal lines through which an electrical signal flows corresponding to the charges that has been accumulated in the radiographic imaging pixels according to the switching state of the switch elements; and one or more radiation detection line, connected to each pixel, out of the plurality of pixels, that has been employed as a radiation detection pixel, through which an electrical signal flows corresponding to the charges that has been generated in the sensor sections of the radiation detection pixels.

The radiographic imaging device of the present invention has pixels including sensor sections in which charge is generated due to irradiation of radiation, or due to illumination of light that has been converted from radiation. Plural of these pixels are disposed in a matrix in a detection region for detecting radiation.

The present invention has pixels, out of the plural pixels, that have been employed as pixels for radiographic image acquisition. The plural scan lines have control signals that flow for switching switch elements. The switch elements are thereby switched. In the present invention, an electrical signal corresponding to the charge that has been accumulated in the radiographic imaging pixels also flows in each of the plural signal lines according to the switching state of each of the switch elements of the radiographic imaging pixels.

In the present invention, there is also one or more radiation detection line that is connected to each pixel, out of the plural pixels, that has been predetermined to be employed for radiation detection. Thereby, electrical signals flow through the radiation detection line corresponding to the charge that has been generated in the sensor sections of the radiation detection pixels.

According to the present invention, each of the pixels, out of the plural pixels provided in a matrix, that has been predetermined to be a radiation detection pixel is employed for radiation detection. The radiation detection line is connected to the radiation detection pixels. Consequently, the present invention can detect radiation without the provision of a new radiation detection sensor. Furthermore, the present invention can generated an image representing the irradiated radiation by interpolating the image data for each of the pixels predetermined as radiation detection pixels, based on the electrical signals flowing in the plural signal lines. The image quality of the above image is better than the image quality of images generated by employing a conventional radiographic imaging apparatus in which the second photoelectric conversion elements have been made large in order to detect the radiation irradiation amount with good precision. In conventional technology, as the size of the second photoelectric conversion elements increases, the pixel size of the first conversion elements in the vicinity around the second photoelectric conversion elements has to get smaller. Consequently, during interpolation processing to generated an image with conventional technology, since the quality of the image overall is aligned to the image quality of the first conversion elements, the quality of the image overall is reduced. In contrast thereto, in cases where the radiation detection pixels are disposed as in the present invention, there is no need for the radiographic imaging pixels in the vicinity around the radiation detection pixels to be reduced in size. Consequently, during interpolation processing to generate image data for the radiation detection pixels from the image data of the radiographic imaging pixels in the vicinity around the periphery of the radiation detection pixels, even if the overall image quality is aligned with the image quality of the radiographic imaging pixels in the vicinity around the radiation irradiation amount detection pixels, there is no reduction in the quality of the overall image.

As explained above, according to the radiographic imaging device of the first aspect of the present invention, good detection precision of radiation by pixels employed for radiation detection may be maintained, while maintaining good radiographic image quality acquired by pixels employed for radiographic image acquisition.

A second aspect of the present invention, in the above aspect, the plurality of scan lines may be connected to switch elements for reading out the charges that has been generated in the sensor sections of the radiation detection pixels; and the plurality of signal lines may be connected to switch elements for reading out the charges that has been generated in sensor sections of the radiation detection pixels.

A third aspect of the present invention, in the above aspects, the sensor sections of the radiation detection pixels may be electrically separated from the signal lines.

A fourth aspect of the present invention, in the above aspects, the radiation detection pixels may be separated with each other by one or more pixels.

A fifth aspect of the present invention, in the above aspects, each of the sensor sections may be configured to include an upper electrode, a photoelectric conversion layer, and a lower electrode; and the radiation detection line may be connected to the lower electrode of the sensor sections of the radiation detection pixel.

A sixth aspect of the present invention, in the above aspects, may further include: a detection section that, based on the charges read out from the radiation detection pixels, detects at least one of, start of irradiation of the radiation, completion of the irradiation of the radiation, and an amount of irradiated radiation, wherein the detection section is connected to one or more radiation detection line.

A seventh aspect of the present invention, in the above aspects, may further include: a radiation irradiation control unit that detects an amount of irradiated radiation and controls a radiation source for irradiating the radiation based on the irradiated amount, wherein the radiation detection line is connected to the radiation irradiation control unit.

An eighth aspect of the present invention is a radiographic imaging apparatus including: the radiographic imaging device of the above aspects; and a detection section that, based on the electrical signal flowing in the radiation detection line, detects at least one of, start of irradiation of the radiation, completion of the irradiation of the radiation, and an amount of irradiated radiation.

Accordingly, by operation in a similar manner to the first aspect, good detection precision of radiation by pixels employed for radiation detection may be maintained, while maintaining good radiographic image quality acquired by pixels employed for radiographic image acquisition. Consequently, at least one measure selected from the group consisting of the radiation irradiation start, the radiation irradiation completion, and the irradiated amount of radiation may be detected with good precision.

A ninth aspect of the present invention, in the above eighth aspect, may further include: a control signal output section that, when the detection section detects the start of the irradiation of the radiation, outputs a control signal to the plurality of scan lines; a generation section that generates image data representing a radiographic image, based on the electrical signals flowing in the plurality of signal lines; and a control section that, during standby controls the control signal output section to repeatedly perform a reset operation that outputs a control signal to the plurality of scan lines to extract charges and thereby extracts charge from the radiographic imaging pixels, and during radiographic imaging, controls the control signal output section such that a control signal is output to the plurality of scan lines that halts extraction of charge when start of irradiation of the radiation has been detected by the detection section and outputs a control signal for performing extraction of charge to the plurality of scan lines after radiation irradiation has been completed.

A tenth aspect of the present invention, in the above ninth aspect, the control section may control the control signal output section during radiographic imaging to repeatedly perform the reset operation until the start of irradiation of the radiation has been detected.

An eleventh aspect of the present invention, in the above ninth aspect, the control section may control the control signal output section during radiographic imaging to output a control signal to the plurality of scan lines for halting extraction of charge until the start of irradiation of the radiation has been detected.

A twelfth aspect of the present invention, in the above aspects, during the reset operation, the control signal output section may output a control signal for performing extraction of charge either in sequence to the plurality of scan lines or at once to all of the plurality of scan lines.

A thirteenth aspect of the present invention, in the above aspects, the generation section may interpolate image data for the radiation detection pixels and may generate image data representing a radiographic image.

Thus, according to the present invention of the above aspects, good precision of radiation irradiation amount detection (AEC) may be maintained while maintaining good radiographic image quality.

BRIEF DESCRIPTION OF THE DRAWINGS

Exemplary embodiments of the present invention will be described in detail based on the following figures, wherein.

DETAILED DESCRIPTION OF THE INVENTION

Explanation follows regarding an exemplary embodiment in which the present invention is applied to a radiographic imaging device 10 of indirect-conversion-type, that first converts radiation into light, then converts the converted light into charge.

[First Exemplary Embodiment]

Figure 1:
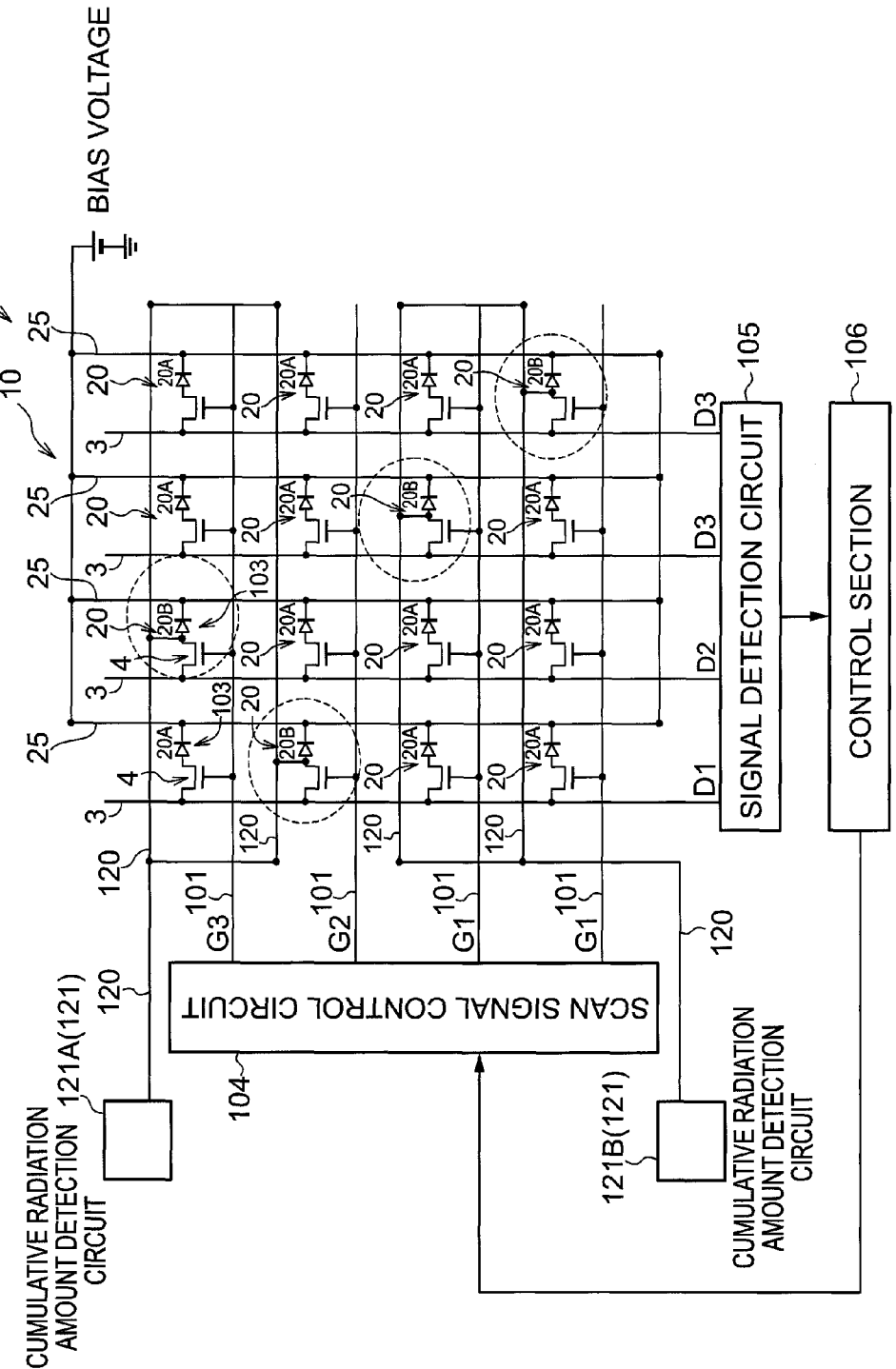
FIG. 1 is a diagram showing an overall configuration of a radiographic imaging apparatus according to a first exemplary embodiment.

FIG. 1 shows an overall configuration of a radiographic imaging apparatus 100 in which the radiographic imaging device 10 according to a first exemplary embodiment is employed.

As shown in FIG. 1, the radiographic imaging apparatus 100 according to the present exemplary embodiment includes the radiographic imaging device 10 of indirect-conversion-type. Note that a scintillator that converts radiation into light is omitted in the drawing.

The radiographic imaging device 10 is provided with plural pixels 20 each configured to include a sensor portion 103 and a TFT switch 4. The sensor portion 103 receives light, generates charge, and accumulates the generated charge. The TFT switch 4 reads out the charge that has accumulated in the sensor portion 103. In the present exemplary embodiment, the sensor section 103 generates charge by illumination with light that has been converted by the scintillator. The TFT switch 4 corresponds to a switch element of the present invention.

Plural of the pixels 20 are disposed in a matrix along one direction (the across direction in FIG. 1, referred to below as the "row direction") and a direction that intersects with the row direction (the vertical direction in FIG. 1, referred to below as the "column direction").

In the present exemplary embodiment, the plural pixels 20 are predetermined as either pixels 20A employed for radiographic image acquisition, or pixels 20B employed for radiation detection. The radiographic imaging pixels 20A are employed to detect radiation for generating an image that represents radiation. On the other hand, the radiation detection pixels 20B are employed for controlling the irradiation of radiation by a radiation source (not shown in the drawings) that irradiates radiation. Note that the proportion of the radiation detection pixels 20B to the total pixels 20 could be, for example, a case of about 1 to 10%. However, this proportion can be determined based on the precision of interpolation processing in a signal processing apparatus that will be explained below. For example, in cases in which the quality of images generated by interpolation processing is unacceptable, the proportion of radiation detection pixels 20B to the total number of pixels 20 is, for example, preferably about 1%. The pixels shown in FIG. 1 inside the broken lines are the radiation detection pixels 20B.

Plural scan lines 101 and plural signal lines 3 are provided in the radiographic imaging device 10 to intersect with each other. The scan lines 101 switch the TFT switches 4 ON/OFF. The charge accumulated in the sensor portions 103 is read out through the signal lines 3.

As explained below, control signals flow in the scan lines 101 for switching each of the TFT switches 4. Accordingly, each of the TFT switches 4 is switched by causing a control signal to flow in each of the scan lines 101.

As explained below, an electrical signal corresponding to the charge that has been accumulated in each of the pixels 20A flows in the signal lines 3, according to the switching state of each switch element of each of the radiographic imaging pixels 20A. More specifically, an electrical signal corresponding to the accumulated charge amount flows in each of the signal lines 3 by the TFT switch 4 being switched ON in one or other of the pixels 20A connected to this signal line 3.

A signal detection circuit 105 is connected to the signal lines 3 for detecting the electrical signal flowing out from each of the signal lines 3. A scan signal control circuit 104 is also connected to the scan lines 101 for outputting a control signal for ON/OFF switching of the TFT switches 4 of each of the scan lines 101.

The signal detection circuit 105 includes an amplifier circuit, that amplifies input electrical signals, for each of the respective signal lines 3. In the signal detection circuit 105, electrical signals input by each of the signal lines 3 are amplified by the amplifier circuits. The signal detection circuit 105 amplifies the electrical signal input by each of the signal lines 3 using the amplification circuits, and converts the signals into digital data. The signal detection circuit 105 thereby detects the charge amount that has been accumulated in each of the sensor sections 103 as data (image data) for each pixel configuring an image.

A control section 106 is connected to the signal detection circuit 105 and the scan signal control circuit 104. The control section 106 executes specific processing, such as, for example, noise removal on the digital data converted in the signal detection circuit 105. The control section 106 also outputs a control signal expressing the timing of signal detection to the signal detection circuit 105, and outputs a control signal expressing the timing of scan signal output to the scan signal control circuit 104.

The control section 106 of the present exemplary embodiment may be configured by a microcomputer. Specifically, the control section 106 includes a Central Processor Unit (CPU), ROM, RAM and a non-volatile storage section configured from flash memory or the like. The control section 106 performs processing (interpolation processing) on the image data that has been subjected to the above specific processing, in order to interpolate image data for each of the radiation detection pixels 20B, and to generate an image representing the irradiated radiation. Namely, the control section 106 generates an image representing the irradiated radiation by interpolation based on the image data that has been subjected to the above specific processing.

In the present exemplary embodiment, as explained below, each of the sensor sections 103 is configured including an upper electrode 22, a photoelectric conversion layer 21, and a lower electrode 11. In the present exemplary embodiment, a radiation detection line 120 is also connected to the lower electrode 11 of each of the radiation detection pixels 20B. Accordingly, the electrical signal corresponding to the charge generated in the sensor sections 103 of the each of the radiation detection pixels 20B flows in the radiation detection line 120.

A cumulative radiation amount detection circuit 121 is connected to the radiation detection line 120 for detecting the total irradiated amount of radiation by integrating the radiation irradiation amounts. In FIG. 1 there is a single cumulative radiation amount detection circuit 121 (121A, 121B) provided for each two pixel rows in the row direction. Each of the cumulative radiation amount detection circuits 121 is connected to a radiation irradiation control unit (not shown in the drawings) for controlling radiation irradiated by the radiation source (not shown in the drawings). Namely, a specific number of the radiation detection lines 120 are connected to each of the cumulative radiation amount detection circuits 121. Configuration may be made with the cumulative radiation amount detection circuit 121 configured to include a radiation irradiation control unit, such that the radiation detection lines 120 are connected to the radiation irradiation control unit (or more specifically to the cumulative radiation amount detection circuit 121 of the radiation irradiation control unit).

As described above, in the present exemplary embodiment, the radiation detection lines 120 are connected without a switch element to the each of the sensor sections 103 of the pixels 20 predetermined as the radiation detection pixels 20B. Accordingly, the radiation detection lines 120 are capable of reading out charge directly from each of the sensor sections 103. Consequently, according to the radiographic imaging device 10 of the present exemplary embodiment, the radiation irradiation amount detection (AEC) can be performed faster than a case in which the radiation detection lines 120 are connected to the sensor sections 103 through switch elements.

Figure 2:
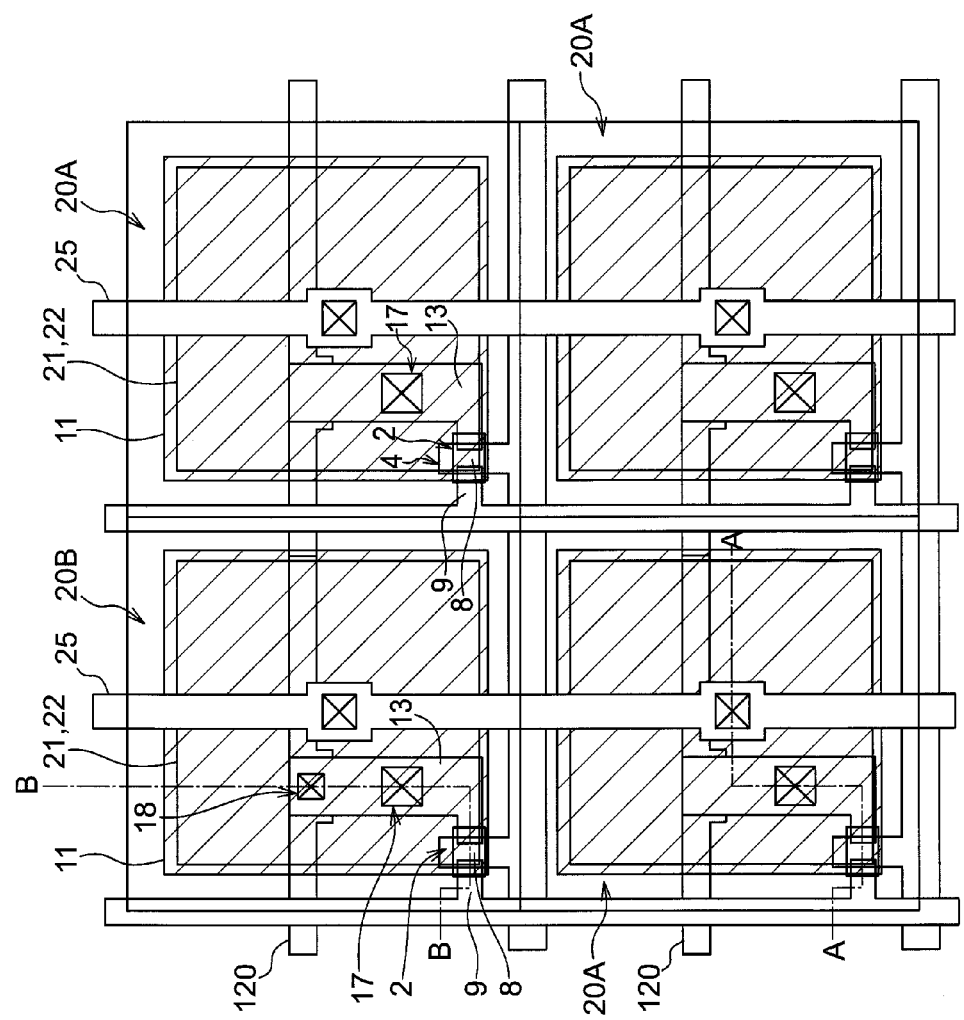
FIG. 2 is a plan view showing a configuration of a radiographic imaging device according to the first exemplary embodiment.
Figure 3:
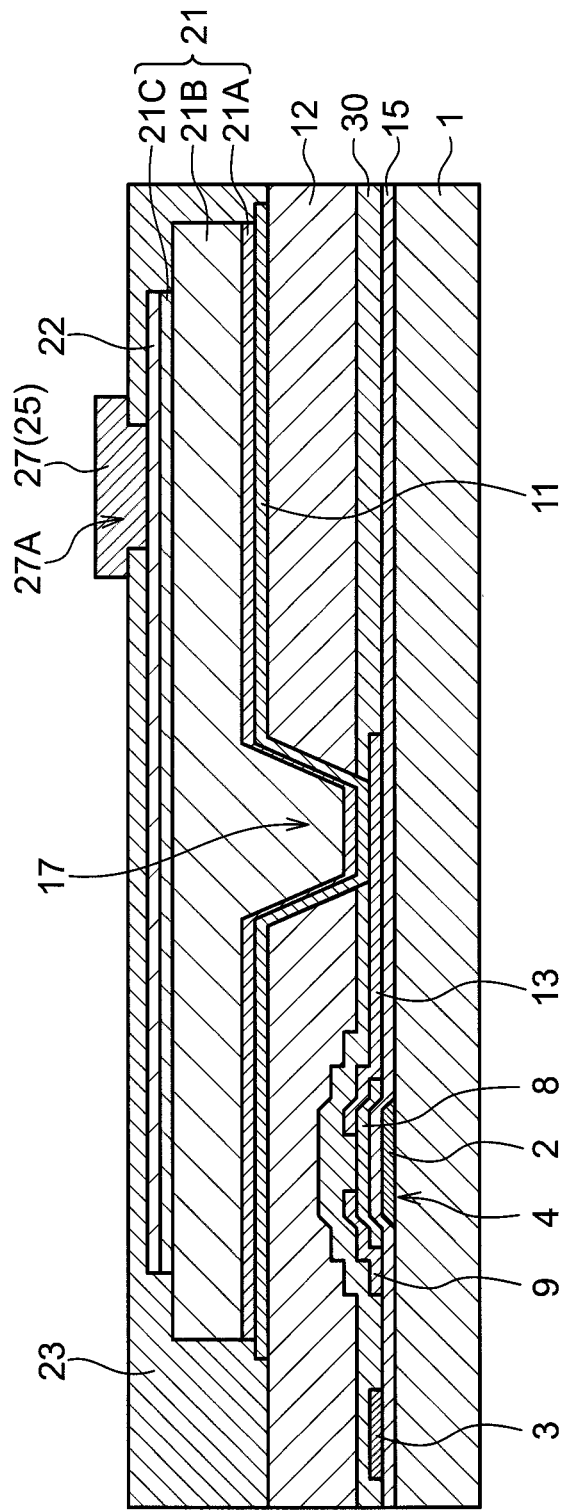
FIG. 3 is a cross-sectional view of a radiographic imaging device according to the first exemplary embodiment.
Figure 4:
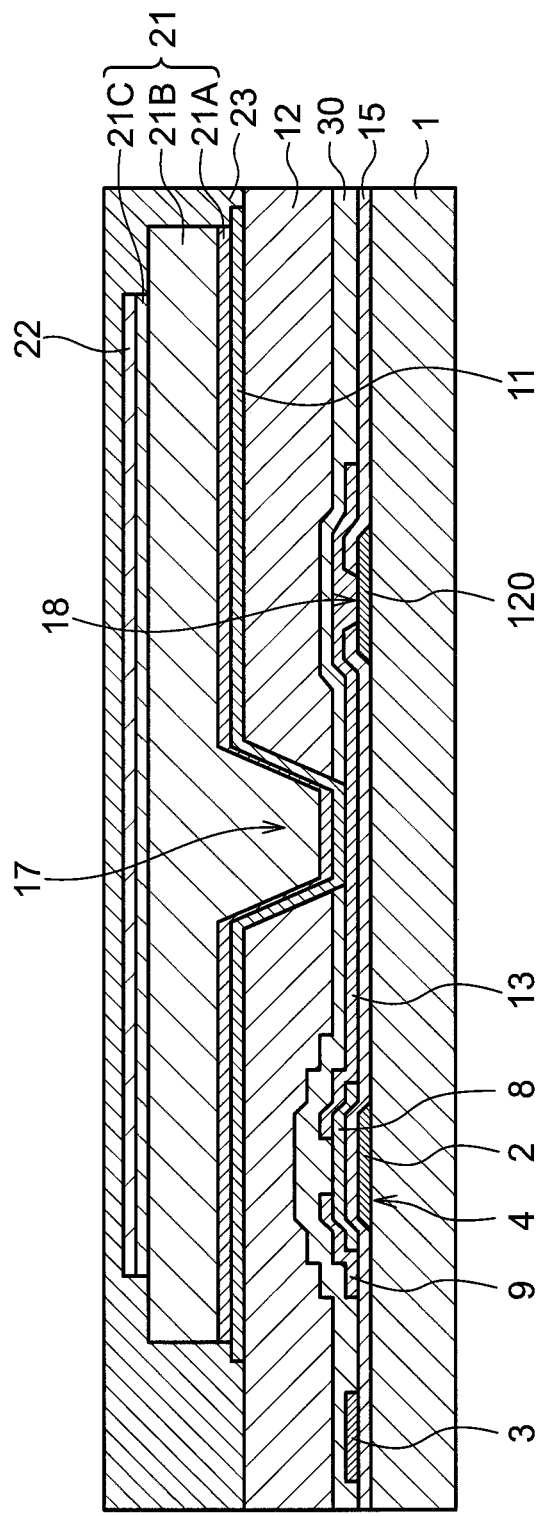
FIG. 4 is a cross-sectional view of a radiographic imaging device according to the first exemplary embodiment.

FIG. 2 shows a plan view of a structure of the indirect-conversion-type radiographic imaging device 10 according to the present exemplary embodiment. FIG. 3 shows a cross-sectional view taken on A-A line of one of the radiographic imaging pixels 20A of FIG. 2. FIG. 4 shows a cross-sectional view taken on B-B line of one of the radiation detection pixels 20B of FIG. 2.

As shown in FIG. 3, the pixel 20A of the radiographic imaging device 10 is formed with an insulating substrate 1 configured from alkali-free glass or the like, on which the scan lines 101, and gate electrodes 2 are formed, with the scan lines 101 connected to the gate electrodes 2 (see FIG. 2). The wiring layer in which this scan lines 101 and gate electrodes 2 are formed (this wiring layer is referred to below as "the first signal wiring layer") is formed from Al and/or Cu, or a layered film mainly composed of Al and/or Cu. However, the material of the first signal wiring layer is not limited thereto.

An insulation film 15 is formed on one face of the first signal wiring layer. The locations of the insulation film 15 positioned over the gate electrodes 2 are employed as a gate insulation film in the TFT switches 4. The insulation film 15 is, for example, formed from $SiN_x$ or the like by, for example, Chemical Vapor Deposition (CVD) film forming.

An island shape of a semiconductor active layer 8 is formed on each of the gate electrodes 2 above the insulation film 15. The semiconductor active layer 8 is a channel portion of the TFT switch 4 and is, for example, formed from an amorphous silicon film.

A source electrode 9 and a drain electrode 13 are formed in a layer above. The wiring layer in which the source electrode 9 and the drain electrode 13 are formed also has the signal lines 3 formed therein. The source electrode 9 is connected to the signal lines 3 (see FIG. 2). The wiring layer in which the source electrode 9, the drain electrode 13 and the signal lines 3 are formed (this wiring layer is referred to below as "the second signal wiring layer") is formed from Al and/or Cu, or a layered film mainly composed of Al and/or Cu. However, the material of the second signal wiring layer is not limited thereto. An impurity doped semiconductor layer (not shown in the drawings) of, for example, impurity doped amorphous silicon or the like, is formed between the semiconductor active layer 8 and both the source electrode 9 and the drain electrode 13. The TFT switch 4 employed for switching is configured as described above. The source electrodes 9 and the drain electrodes 13 of the of the TFT switches 4 are of opposite polarity to that of the charge collected and accumulated with the lower electrode 11, described below.

A TFT protection layer 30 is formed over substantially the whole surface (substantially the entire region) of regions provided with the pixels 20 above the substrate 1 so as to cover the second signal wiring layer, so as to protect the TFT switches 4 and the signal lines 3. The TFT protection layer 30 is formed, for example, from $SiN_x$ or the like, by, for example, CVD film forming.

A coating type intermediate insulation film 12 is formed above the TFT protection layer 30. This intermediate insulation film 12 is formed from a photosensitive organic material of low permittivity (dielectric constant $\in_r = 2$ to 4) (for example, a material such as a positive-working photosensitive acrylic resin: a base polymer of a copolymer of methacrylic acid and glycidyl methacrylate, into which a naphthoquinone-diazido positive-working photosensitive agent has been mixed). The film thickness of the intermediate insulation film 12 is 1 µm to 4 µm.

In the radiographic imaging device 10 according to the present exemplary embodiment, capacitance between the metal layers disposed above and below the intermediate insulation film 12 can be suppressed to a low value by provision of the intermediate insulation film 12. Furthermore, generally such materials also have the functionality of a flattening layer, and exhibit the effect of flattening the steps in the layer below. In the radiographic imaging device 10 according to the present exemplary embodiment, a contact hole 17 is formed in the intermediate insulation film 12 and the TFT protection layer 30 at positions facing the drain electrode 13.

The lower electrode 11 of each of the sensor sections 103 is formed on the intermediate insulation film 12 to fill the contact hole 17 and cover the pixel region. The lower electrode 11 contacts the drain electrode 13 of the TFT switch 4. As long as the lower electrode 11 is electrically conductive, there are no particular limitations to the material of the lower electrode 11 for cases in which the thickness of a semiconductor layer 21, described below, is about 1 μm. Hence the lower electrode 11 may be formed with an electrically conductive metal such as, for example, an Al based material, ITO or the like.

However, in cases in which the film thickness of the semiconductor layer 21 is thin (about 0.2 μm to 0.5 μm), light is not sufficiently absorbed by the semiconductor layer 21, and measures need to be taken to prevent an increase in leak current flow due to light illumination onto the TFT switch 4. Consequently, in such cases the lower electrode 11 is preferably an alloy or layered film with a metal having light-blocking ability as a main component.

The semiconductor layer 21 is formed on the lower electrode 11 and functions as a photodiode. In the present exemplary embodiment, a photodiode of PIN structure is employed, in which an $n^+$ layer, an i layer and a $p^+$ layer ($n^+$ amorphous silicon, amorphous silicon, $p^+$ amorphous silicon) are layered on each other as the semiconductor layer 21. Consequently, in the semiconductor layer 21 of the present exemplary embodiment, an $n^+$ layer 21A, an i layer 21B and a $p^+$ layer 21C are formed, layered in this sequence from the bottom layer. The i layer 21B generates charge (pairs of free electrons and free holes) due to illumination with light. The $n^+$ layer 21A and the $p^+$ layer 21C function as contact layers, and respectively electrically connect the lower electrode 11 and the upper electrode 22 with the i layer 21B. Note that the i layer 21B corresponds to the photoelectric conversion layer of the present invention.

In the present exemplary embodiment, the lower electrode 11 is formed with larger surface area than the semiconductor layer 21. Further, the light illumination side of the TFT switch 4 is covered by the semiconductor layer 21. Accordingly, in the present exemplary embodiment, the proportion of surface area within the pixel regions that can receive light (called the fill factor) is made larger, and light can be suppressed from being incident on the TFT switches 4.

Individual upper electrodes 22 are formed on each of the semiconductor layers 21. The upper electrodes 22 are, for example, formed using a material having high light transmissive, such as ITO, Indium Zinc Oxide (IZO) or the like. In the radiographic imaging device 10 according to the present exemplary embodiment, each of the sensor section 103 is configured including the upper electrode 22, the semiconductor layer 21, and the lower electrode 11.

A coating-type intermediate insulation film 23, with an opening 27A corresponding to a portion of the upper electrode 22, is formed on the intermediate insulation film 12, the semiconductor layer 21, and the upper electrode 22, so as to cover the semiconductor layer 21.

Common electrode lines 25 are formed by a layered film of Al and/or Cu, or an alloy mainly composed of Al and/or Cu formed on the intermediate insulation film 23. Contact pads 27 are formed to the common electrode line 25 in the vicinity of the opening 27A. The common electrode lines 25 are electrically connected to the upper electrodes 22 by the contact pads 27 via the openings 27A in the intermediate insulation films 23.

As shown in FIG. 4, in each of the pixels 20B of the radiographic imaging device 10 there is a scan line 101, a gate electrode 2, and a radiation detection line 120 formed on the insulating substrate 1, formed from alkali-free glass of the like. The scan line 101 is connected to the gate electrode 2 (see FIG. 2). The wiring layer in which the scan lines 101, the gate electrodes 2, and the radiation detection lines 120 are formed (the first signal wiring layer) is formed from Al and/or Cu, or a layered film mainly composed of Al and/or Cu. However, the material of the first signal wiring layer is not limited thereto.

The insulation film 15 is formed on one face of the first signal wiring layer, and locations above each of the gate electrodes 2 act as a gate insulation film in the TFT switches 4. The insulation film 15 is formed, for example, from $SiN_x$ or the like by, for example, Chemical Vapor Deposition (CVD) film forming.

An island shape of the semiconductor active layer 8 is formed on each of the gate electrodes 2 above the insulation film 15. The semiconductor active layer 8 is a channel portion of the TFT switch 4 and is, for example, formed from an amorphous silicon film.

The source electrodes 9 and the drain electrodes 13 are formed in the layer above the semiconductor active layer 8. The wiring layer in which the source electrodes 9 and the drain electrodes 13 are formed is also formed with the signal lines 3 therein. The source electrodes 9 are connected to the signal lines 3 (see FIG. 2). The wiring layer in which the source electrodes 9, the drain electrodes 13 and the signal lines 3 are formed (this wiring layer is referred to below as "the second signal wiring layer") is formed by from Al and/or Cu, or a layered film mainly composed of Al and/or Cu. However, the material of the second signal wiring layer is not limited thereto. An impurity doped semiconductor layer (not shown in the drawings) of, for example, impurity doped amorphous silicon or the like, is formed between each of the semiconductor active layers 8 and both the source electrode 9 and the drain electrode 13. The TFT switches 4 employed for switching are configured by the above. The source electrodes 9 and the drain electrodes 13 of the TFT switches 4 are of opposite polarity to that of the charge collected and accumulated with the lower electrodes 11, described below.

In each of the pixels 20B of the radiographic imaging device 10 according to the present exemplary embodiment, there is a contact hole 18 formed at a position of the drain electrode 13 facing the radiation detection line 120.

Each of the drain electrodes 13 is formed on the insulation film 15 to infill the contact hole 18. The radiation detection line 120 is connected to the drain electrode 13 of the TFT switch 4. Namely, the radiation detection line 120 is electrically connected to the lower electrodes 11. Accordingly, the radiation detection line 120 is connected to the lower electrodes 11, not via the TFT switches 4. Consequently, the radiation detection line 120 can directly read out charge of the sensor sections 103. Accordingly, the present exemplary embodiment is capable of performing radiation irradiation amount detection faster than cases in which the radiation detection line 120 and the sensor sections 103 are connected via switch elements.

A TFT protection layer 30 is formed above the substrate 1 over substantially the whole surface of regions provided with the pixels 20 (substantially the entire region) covering the second signal wiring layer, to protect the TFT switches 4 and the signal lines 3. The TFT protection layer 30 is formed, for example, from $SiN_x$ or the like, by, for example, CVD film forming.

A coating type intermediate insulation film 12 is formed above the TFT protection layer 30. This intermediate insulation film 12 is formed from a photosensitive organic material of low permittivity (dielectric constant $\epsilon_r = 2$ to 4) (for example, a material such as a positive-working photosensitive acrylic resin: a base polymer of a copolymer of methacrylic acid and glycidyl methacrylate, into which a naphthoquinone-diazido positive-working photosensitive agent has been mixed). The film thickness of the intermediate insulation film 12 is 1 μm to 4 μm.

In the radiographic imaging device 10 according to the present exemplary embodiment, capacitance between the metal layers disposed below and above the intermediate insulation film 12 can be suppressed low by provision of the intermediate insulation film 12. Furthermore, generally such materials also have functionality as a flattening layer, and exhibit the effect of flattening out steps in the layer below. In the radiographic imaging device 10 according to the present exemplary embodiment, contact holes 17 are formed in the intermediate insulation film 12 and the TFT protection layer 30 at positions facing the drain electrode 13.

Each of the lower electrodes 11 of the sensor section 103 is formed on the intermediate insulation film 12 to fill the contact hole 17 and cover the pixel region. The lower electrode 11 contacts the drain electrode 13 of the TFT switch 4. There are no particular limitations to the material of the lower electrode 11 for cases where the thickness of the semiconductor layer 21, described below, is about 1 μm, as long as it is electrically conductive. Hence the lower electrodes 11 may be formed with electrically conductive metal such as, for example, an AL based material, ITO or the like.

However, in cases in which the film thickness of the semiconductor layer 21 is thin (about 0.2 μm to 0.5 μm), light is not sufficiently absorbed by the semiconductor layer 21, and measures need to be taken to prevent an increase in leak current flow due to light illumination onto the TFT switch 4. Consequently, in such cases the lower electrode 11 is preferably an alloy or layered film with a metal having light-blocking ability as a main component.

The semiconductor layer 21 is formed on the lower electrode 11 and functions as a photodiode. In the present exemplary embodiment, the photodiode of PIN structure is employed in which an $n^+$ layer, an i layer and a $p^+$ layer ($n^+$ amorphous silicon, amorphous silicon, $p^+$ amorphous silicon) are layered on each other. Consequently, in the semiconductor layer 21 of the present exemplary embodiment, an $n^+$ layer 21A, an i layer 21B and a $p^+$ layer 21C are layered on each other in this sequence from the bottom layer. The i layer 21B generates charge on illumination with light (pairs of free electrons and free holes). The $n^+$ layer 21A and the $p^+$ layer 21C function as contact layers, and respectively electrically connect the lower electrode 11 and the upper electrode 22 with the i layer 21B.

In the present exemplary embodiment, the lower electrode 11 is formed larger than the semiconductor layer 21. The light illumination side of the TFT switch 4 is covered by the semiconductor layer 21. Accordingly, in the present exemplary embodiment, the proportion of surface area within the pixel regions that can receive light (called the fill factor) can be made larger, and light can be suppressed from being incident on the TFT switches 4.

Individual upper electrodes 22 are formed on each of the semiconductor layers 21. The upper electrodes 22 are, for example, formed using a material having high transmissivity to light, such as ITO, Indium Zinc Oxide (IZO) or the like. In the radiographic imaging device 10 according to the present exemplary embodiment, each of the sensor sections 103 is configured including one of the upper electrodes 22, one of the semiconductor layers 21, and one of the lower electrodes 11.

The coating type intermediate insulation film 23 is formed over the intermediate insulation film 12, the semiconductor layer 21, and the upper electrode 22.

In the radiographic imaging device 10 configured as described above, as required, a protection layer may be formed from an insulating material with low light absorption characteristics, and a scintillator, configured, for example, from GOS or the like, is attached using an adhesive resin with low light absorption characteristics formed on the surface of the protection layer.

Figure 5:
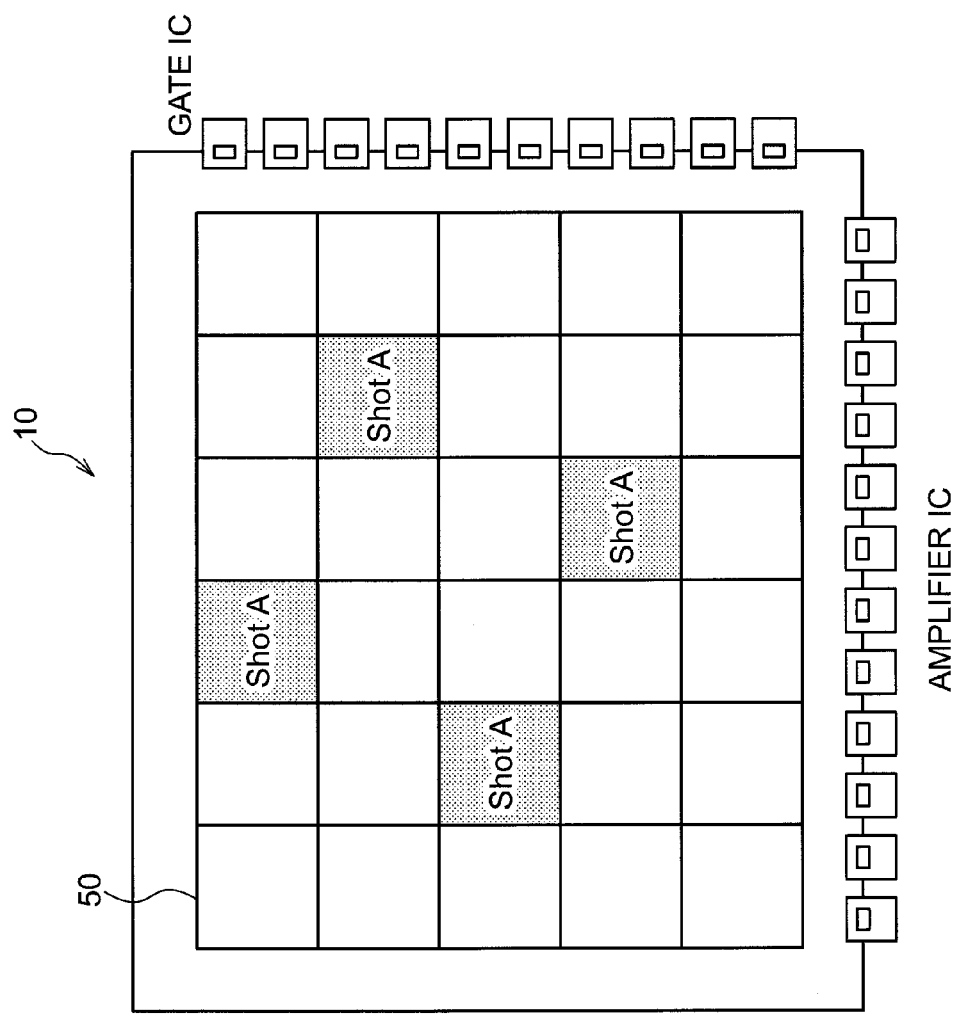
FIG. 5 is an explanatory diagram of designing pixels employed for radiation detection according to the first exemplary embodiment.
Figure 6:
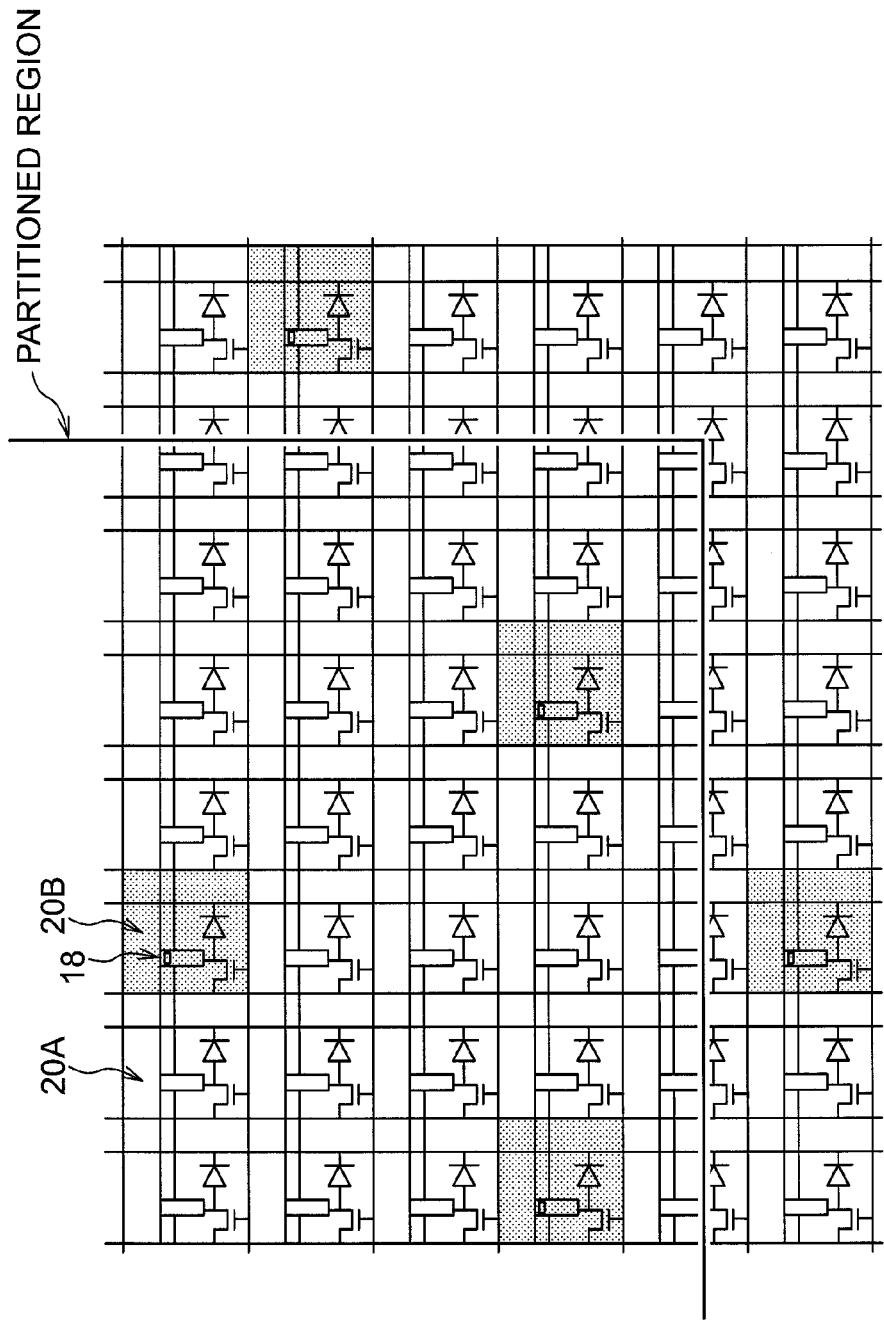
FIG. 6 is diagram showing an example of a partitioned area, according to the first exemplary embodiment, in which radiographic imaging pixels and radiation detection pixels are disposed.
Figure 7:
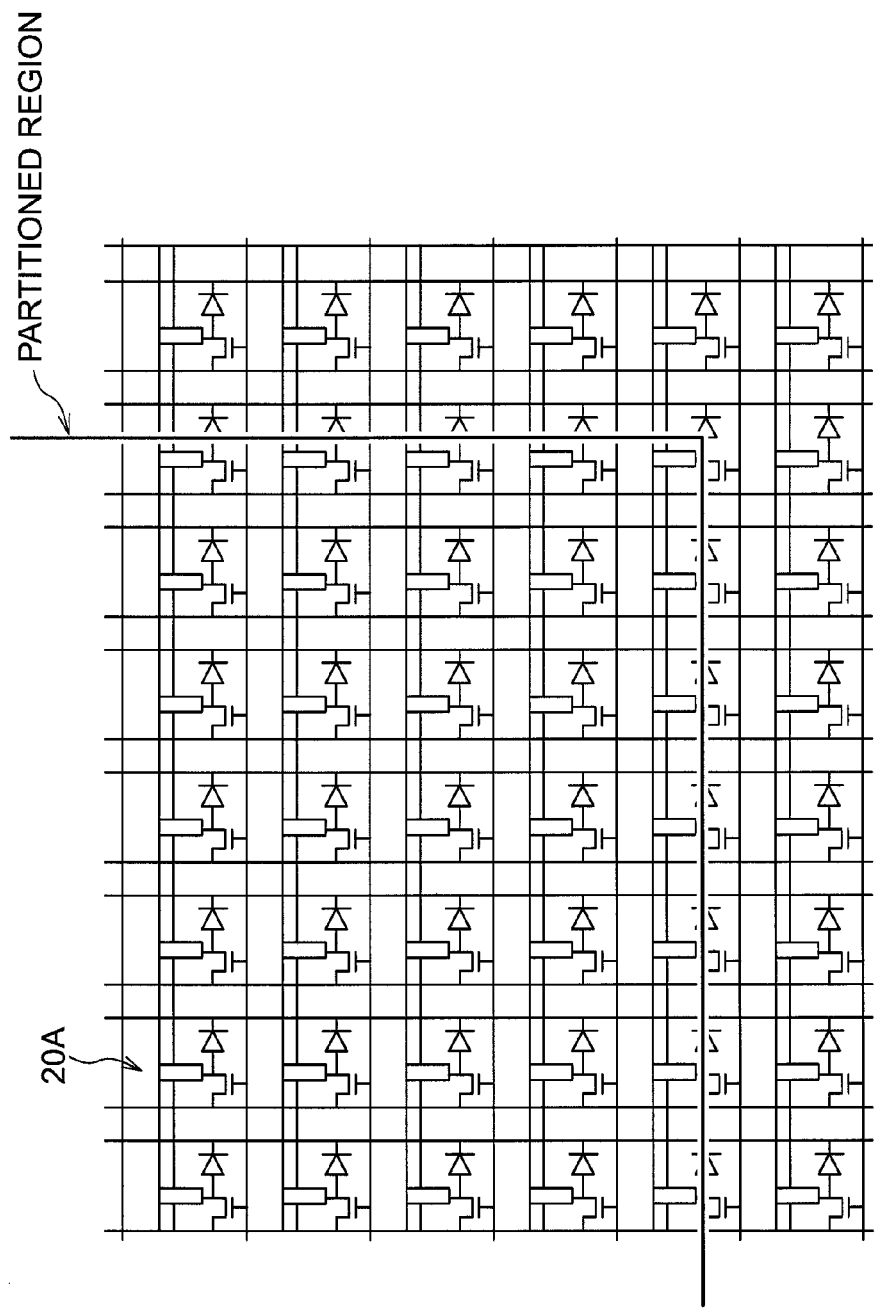
FIG. 7 is a diagram showing an example of a partitioned area, according to the first exemplary embodiment, in which radiographic imaging pixels are disposed.

Explanation now follows regarding an example of a method for forming the contact holes 18. For cases in which the active area of the radiographic imaging device 10 is larger than the photomask, as shown in FIG. 5, an active area 50 is partitioned and light exposure is performed for each of the partitioned regions. In the example of FIG. 5, the active area 50 is partitioned into 5×6 shots. Each of the partitioned regions is shown in FIG. 5, and in the present exemplary embodiment, the regions (portions) denoted as "Shot A" are exposed with light while employing a photomask for forming the contact holes 18. Accordingly, for example, as shown in FIG. 6, the radiographic imaging pixels 20A and the radiation detection pixels 20B are disposed in the partitioned areas. When disposing the regions, preferably a separation between each of the pixels predetermined as the radiation detection pixels 20B is set as a separation of one pixel or greater, in order that the radiation detection pixels 20B are not disposed adjacent to each other. By so doing, the quality of the images generated by interpolation processing by the signal processing device is better than in cases where there are radiation detection pixels 20B disposed adjacent to each other. Light exposure is not performed in the regions out of the partitioned regions where there is nothing written (blank portions). Consequently, as shown in FIG. 7, only the pixels predetermined as the radiographic imaging pixels 20A are disposed in these regions. Note that the size of the "Shot A" regions may be, for example, determined according to the size of the site of interest in the investigation subject.

Figure 8:
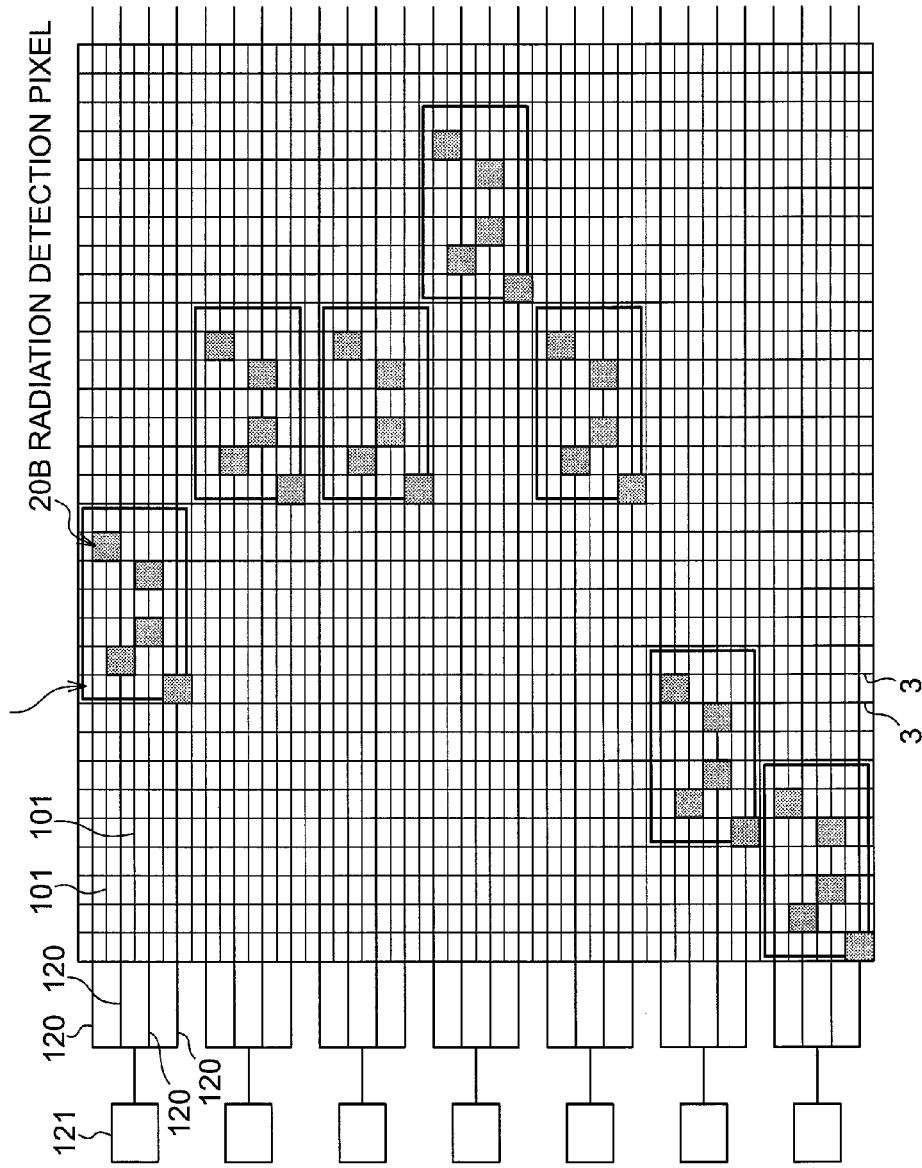
FIG. 8 is a diagram showing an example of region provided with radiation detection pixels, according to the first exemplary embodiment, provided in a radiation irradiation region in which detection is desired.

FIG. 8 shows an example of setting the "Shot A" regions for the regions where detection of the radiation irradiation amount (light exposure amount) is desired, in which the radiation detection pixels 20B are provided in the regions in which detection of radiation irradiation amount is desired.

Explanation now follows regarding the operational principles of the radiographic imaging apparatus 100 configured as described above.

When X-rays are irradiated, the irradiated X-rays are absorbed by the scintillator and are converted into visible light. Note that the X-rays may be irradiated onto either the front side or the back side of the radiographic imaging device 10. The light that has been converted into visible light by the scintillator is illuminated onto the semiconductor layer 21 of the sensor sections 103 that are disposed in an array on the substrate 1.

In the radiographic imaging device 10, the semiconductor layer 21 is provided separated into units of each pixel. The semiconductor layer 21 is applied with a specific bias voltage from the upper electrode 22 through the common electrode line 25, and charge is internally generated in the semiconductor layer 21 on illumination with light. For example, a negative bias voltage is applied to the upper electrode 22 for cases in which the semiconductor layer 21 is of a PIN construction with a stacked layer sequence from the bottom layer of $n^+$ layer, i layer, and $p^+$ layer. The bias voltage applied is about −5V to −10V for cases in which the film thickness of the i layer 21 is about 1 μm.

In the semiconductor layer 21, a current of only several pA/mm² or less flows in the bias voltage applied state when light is not being illuminated. However, when light is illuminated (1 μW/cm²) in the bias voltage applied state, a light current is generated at about several to several tens of nA/mm². This generated charge is collected by the lower electrode 11. The lower electrode 11 is connected to the drain electrode 13 of the TFT switch 4 in each of the pixels 20A. The source electrode 9 of the TFT switch 4 is connected to the signal line 3. The lower electrode 11 is connected to the drain electrode 13 of the TFT switch 4 and the radiation detection line 120 in each of the pixels 20B. During image detection, a negative bias is applied to the gate electrodes 2 of the TFT switches 4 in the pixels 20A, thereby maintaining an OFF state, and charge collected by the lower electrodes 11 is accumulated.

During image read-out, an ON signal is output for the pixels 20A in sequence one line at a time from the scan signal control circuit 104 to the scan lines 101. Then an ON signal (+10V to 20V) is applied in sequence through the scan lines 101 to the gate electrodes 2 of the TFT switches 4. Accordingly the TFT switches 4 of the plural disposed pixels 20A are switched ON in sequence. An electrical signal corresponding to the charge amount accumulated in each of the lower electrodes 11 flows out of the signal lines 3. The signal detection circuit 105 converts the electrical signal flowing in each of the signal lines 3 into digital data. In the control section 106, specific processing is performed on the converted digital data, and then processing is performed on the image data that has been subjected to the specific processing, in order to interpolate the image data for each of the radiation detection pixels 20B. As a result, the radiographic imaging apparatus 100 generates an image representing the irradiated radiation. The image quality of the image generated by such interpolation has better quality than a conventional radiographic imaging apparatus in which the second photoelectric conversion elements have been made large, due to the radiation irradiation amount being detected with high precision. As the size of the second photoelectric conversion elements increases, the pixel size of the first conversion elements in the vicinity around the second photoelectric conversion elements gets smaller. During interpolation processing to generated an image, the quality of the image overall is aligned to the image quality of the first conversion elements. Consequently, the quality of the image overall is reduced in the conventional technology. In contrast thereto, in cases where the radiation detection pixels 20B are disposed as in the present exemplary embodiment, there is no need for the radiographic imaging pixels 20A in the vicinity around the radiation detection pixels 20B to be reduced in size. As a result, during interpolation processing to generate an image, even if the overall image quality is aligned with the image quality of the radiographic imaging pixels 20A in the vicinity around the radiation detection pixels 20B, there is no reduction in the quality of the overall image.

In the pixels 20B, the lower electrodes 11 are connected directly to the radiation detection line 120 and not through a switch element. Consequently, the electrical signal corresponding to the charge generated in the sensor section 103 flows out in the radiation detection line 120. The cumulative radiation amount detection circuit 121 detects the total radiation illumination amount by integrating the irradiation amounts of the radiation. The radiation irradiation control unit controls irradiation of radiation by the radiation source based on the total radiation illumination amount detected.

According to the radiographic imaging device 10 of the present exemplary embodiment, each of the pixels 20 predetermined as the radiation detection pixels 20B, from out of the plural pixels 20 disposed in a matrix, is employed for radiation irradiation amount detection. According to the radiographic imaging device 10 of the present exemplary embodiment, the electrical signal corresponding to the charge generated in the sensor section 103 of each of these pixels flows in the radiation detection lines 120. Consequently, the radiographic imaging device 10 of the present exemplary embodiment can perform radiation irradiation amount detection without the provision of a new sensor for radiation irradiation amount detection.

As explained above, according to the radiographic imaging device 10 of the present exemplary embodiment, the precision of radiation irradiation amount detection (AEC) can be maintained at a good level while also maintaining the image quality.

According to the radiographic imaging device 10 of the present exemplary embodiment, the radiation detection line 120 is connected to the sensor sections 103 in each of the pixels predetermined to be the radiation detection pixels 20B, not through a switch element. Consequently, the radiographic imaging device 10 of the present exemplary embodiment can directly read out the charge of each of the sensor sections 103. Consequently, according to the radiographic imaging device 10 of the present exemplary embodiment, the radiation irradiation amount detection can be performed faster than in cases in which the radiation detection line 120 and the sensor sections 103 are connected through switch elements.

According to the present exemplary embodiment, the radiographic imaging pixels 20A and the radiation detection pixels 20B are provided in an imaging region in which the radiographic imaging device 10 is capable of capturing a radiographic image. Consequently, the present exemplary embodiment can ensure radiation detection even for cases in which a narrow radiation irradiation region is provided.

According to the present exemplary embodiment, the radiation detection pixels 20B are the same shape as the radiographic imaging pixels 20A, and are disposed distributed amongst the radiographic imaging pixels 20A. Consequently, the present exemplary embodiment can prevent generation of artifacts and deterioration in quality of radiographic images captured.

[Second Exemplary Embodiment]

Explanation now follows regarding a second exemplary embodiment.

Figure 9:
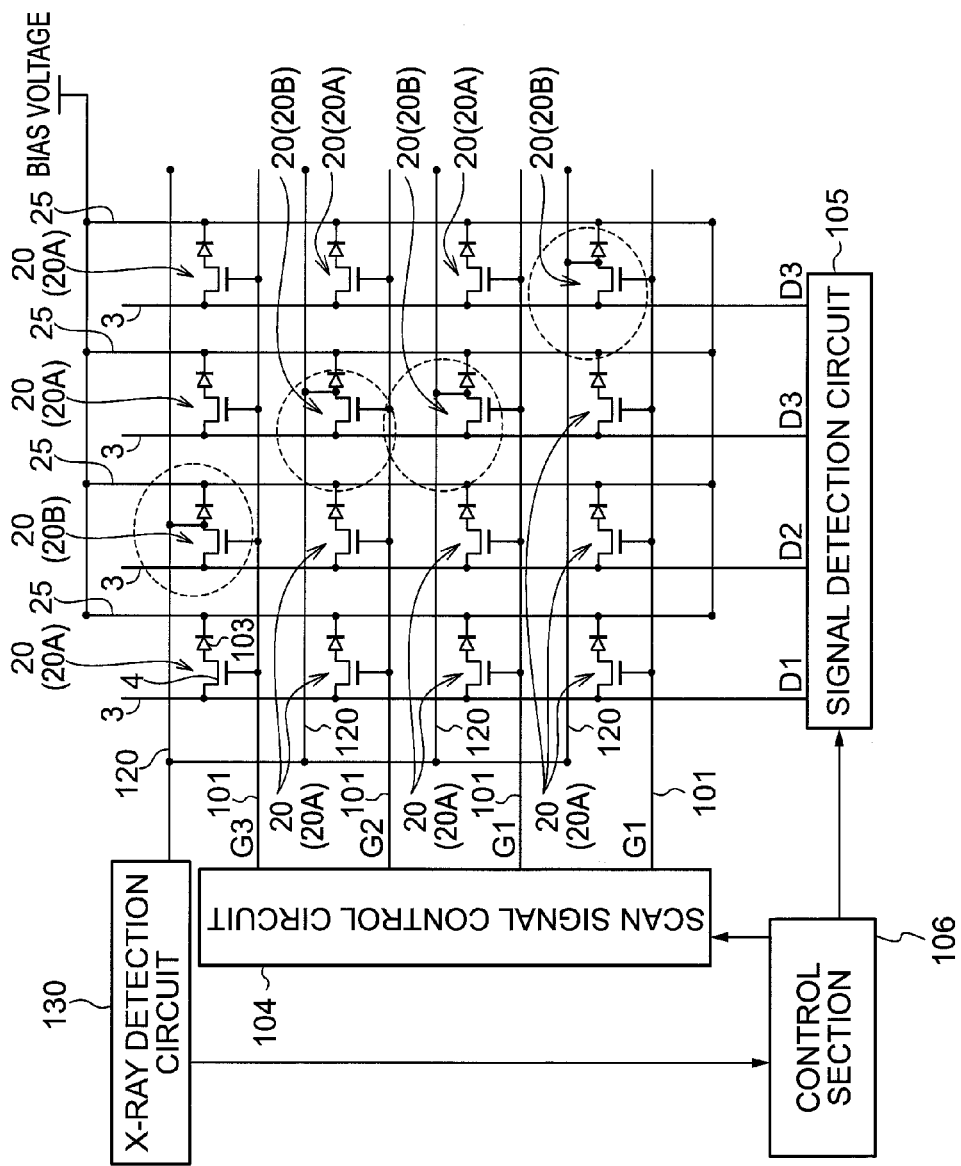
FIG. 9 is a diagram showing an overall configuration of a radiographic imaging apparatus according to a second exemplary embodiment.

FIG. 9 shows an overall configuration of a radiographic imaging apparatus 100 employing a radiographic imaging device 10 according to a second exemplary embodiment. Note that since the configuration of the radiographic imaging device 10 according to the second exemplary embodiment is similar to that of the first exemplary embodiment (see FIG. 2 to FIG. 4), further explanation thereof is omitted.

The radiographic imaging apparatus 100 according to the present exemplary embodiment is equipped with an X-ray detection circuit 130.

The radiation detection lines 120 provided to the radiographic imaging device 10 are connected to the X-ray detection circuit 130. The X-ray detection circuit 130 amplifies the electrical signal flowing in the radiation detection lines 120 with an amplification circuit. The X-ray detection circuit 130 operates under control from the control section 106, amplifies the electrical signal input by the radiation detection lines 120 with the amplification circuit, converts the signal into digital data, and outputs the digital data to the control section 106.

Figure 10:
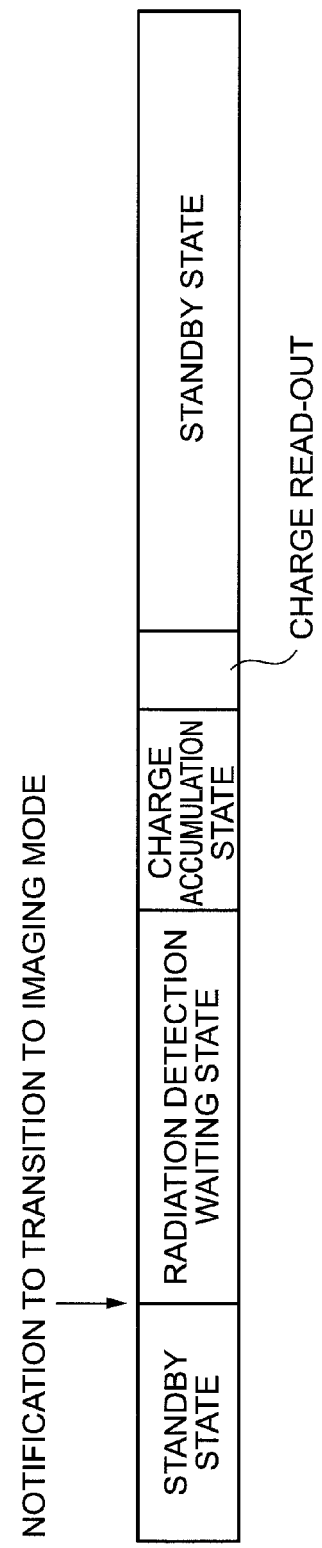
FIG. 10 is a schematic diagram showing operation of a radiographic imaging apparatus according to the second exemplary embodiment during radiographic imaging.

Simple explanation now follows regarding the operation during radiographic imaging with the radiographic imaging apparatus 100 according to the present exemplary embodiment, with reference to FIG. 10.

The radiographic imaging device 10 accumulates charge that is generated in each of the pixels 20, for example, by dark current or the like, even when in a state in which there is no radiation being irradiated. Therefore the radiographic imaging apparatus 100 repeatedly performs a reset operation to extract and remove the charge that has been accumulated in each of the pixels 20 of the radiographic imaging device 10 during the standby state. The information from the charge read out in the reset operation is utilized in correction (off-set) of noise generated in the radiographic image by dark current or the like.

The radiographic imaging apparatus 100 detects the start of the irradiation of the radiation, then starts the accumulation of charge in each of the pixels 20 of the radiographic imaging device 10, and captures the radiographic image. In order to perform radiographic imaging, the radiographic imaging apparatus 100 is notified to transition to an imaging mode.

When notified to transition to the imaging mode, the radiographic imaging apparatus 100 transitions to a radiation detection waiting state for performing radiation detection. Then, when the radiographic imaging apparatus 100 detects irradiation of radiation, transition is made to a charge accumulation state for accumulating charge in the radiographic imaging device 10. Then after a specific duration has elapsed from detecting irradiation of radiation, the radiographic imaging apparatus 100 transitions to a charge read-out state for reading out the charge that has accumulated. Finally, when reading out of the charge is completed, the radiographic imaging apparatus 100 transitions to a standby state.

Figure 11:
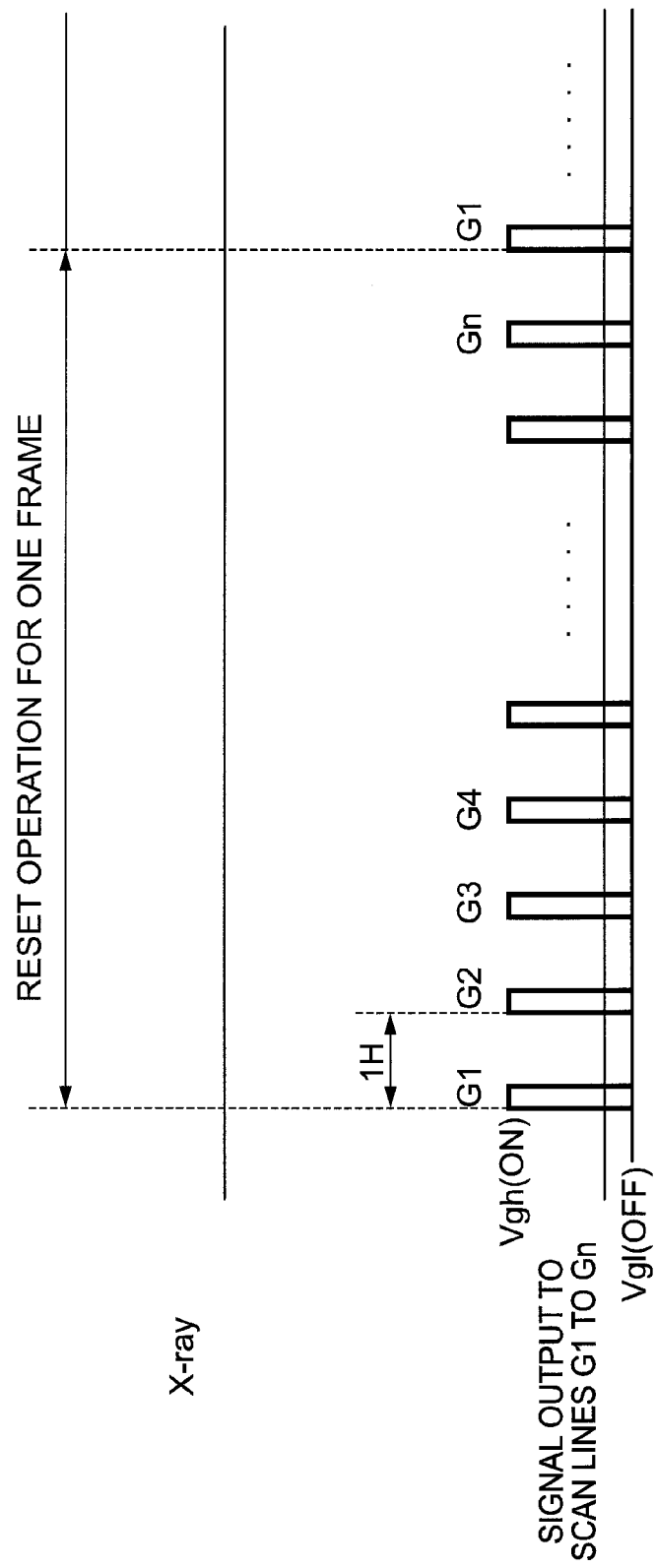
FIG. 11 is a timing chart in which details are shown of operation of a radiographic imaging apparatus according to the second exemplary embodiment in a standby state.
Figure 12:
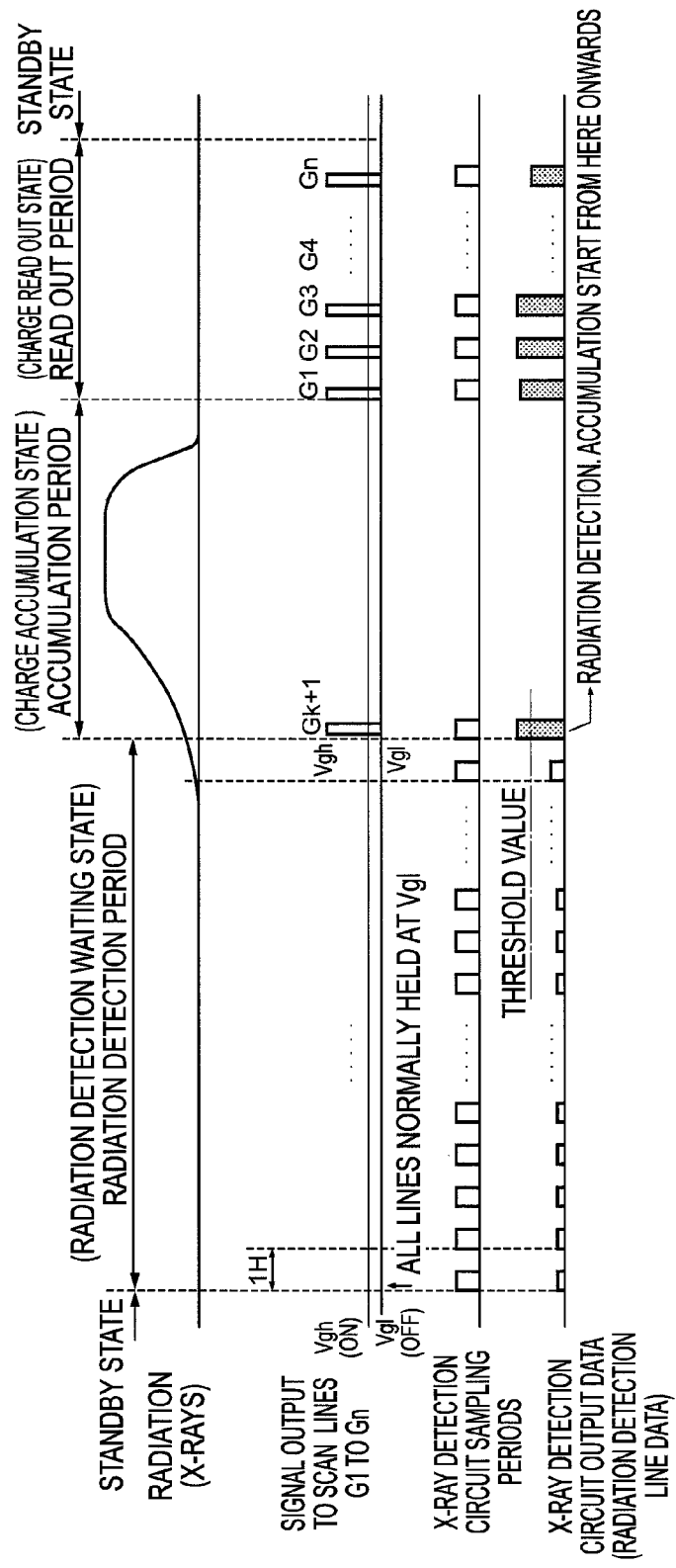
FIG. 12 is a time chart in which details are shown of operation of a radiographic imaging apparatus according to the second exemplary embodiment during radiographic imaging.

FIG. 11 and FIG. 12 show timing charts showing the flow of operation during radiographic imaging with the radiographic imaging apparatus 100 according to the second exemplary embodiment.

The control section 106 controls the scan signal control circuit 104 when in the standby state, and, as shown in FIG. 11, outputs an ON signal (voltage VgH signal) from the scan signal control circuit 104 to each of the scan lines 101, in sequence one line at a time. Then the control section 106 switches each of the TFT switches 4 connected to each of the scan lines 101 ON in sequence one line at a time and read out the charges. The charge that has accumulated in each of the pixels 20 thereby flows out through each of the signal lines 3 as an electrical signal, in sequence one line at a time. While the operation state is the standby state, after a specific duration has elapsed, the control section 106 outputs an ON signal to each of the scan lines 101 in sequence one line at a time, and read out the charges that has been accumulated in each of the pixels 20 of the radiographic imaging device 10. The control section 106 thereby repeatedly performs a reset operation to reset one frame's worth.

The control section 106 transitions to the radiation detection waiting state when notified to transition to the imaging mode. Then, the control section 106 controls the scan signal control circuit 104 and, as shown in FIG. 12, outputs an OFF signal (a voltage Vgl signal) from the scan signal control circuit 104 to each of the scan lines 101. The control section 106 also controls the X-ray detection circuit 130 to start sampling of the radiation detection lines 120 with the X-ray detection circuit 130. The X-ray detection circuit 130 performs repeated sampling at a specific period 1H, by detecting the electrical signal flowing in the radiation detection lines 120, converting the signal into digital data, and outputting the digital data to the control section 106. The specific period 1H is the same period as that with which the ON signal is output from the scan signal control circuit 104 to each of the scan lines 101 in sequence one line at a time for reading out an image, and the same period as that for one line when performing the reset operation.

The radiographic imaging apparatus 100 is disposed with a separation to a radiation generation device for generating radiation, and radiation is irradiated through an investigation subject.

When radiation is irradiated, the irradiated radiation is absorbed by the scintillator and converted into visible radiation. Note that the radiation may be irradiated onto either the front side of the back side of the radiographic imaging device 10. The light that has been converted into visible light by the scintillator is irradiated onto each of the sensor sections 103 of the pixels 20.

Charge is generated within the sensor sections 103 on irradiation with radiation. The generated charge is collected by the lower electrodes 11.

In each of the pixels 20A, the charge collected in the lower electrode 11 is accumulated. However, in each of the pixels 20B, the charge collected by the lower electrode 11 flows out through the radiation detection lines 120. The electrical signal flowing out from each of the pixels 20B is integrated by the radiation detection lines 120. Namely, even if the change in level of the electrical signal that has flowed out from each of the pixels 20B is small, the electrical signal of each of the pixels 20B is integrated together. Consequently, the change in level of the electrical signal due to the X-rays is made larger, and the present exemplary embodiment can therefore raise the precision of radiation detection.

The control section 106 compares the value of the digital data converted by the X-ray detection circuit 130 with a predetermined specific threshold value for use in radiation notification. The control section 106 then performs detection of whether radiation has been irradiated by determining whether the comparison value is the threshold value or higher.

When irradiation of radiation has been detected, the control section 106 controls the scan signal control circuit 104 after a specific accumulation duration has elapsed, and causes an ON signal to be output from the scan signal control circuit 104 to each of the scan lines 101, in sequence one line at a time. The control section 106 thereby applies the ON signal through the scan lines 101 in sequence to the gate electrodes 2 of the TFT switches 4. By so doing, the TFT switches 4 of the plural disposed radiographic imaging pixels 20A are switched ON in sequence, and electrical signals corresponding to the charge amount accumulated in each of the pixels 20A flows out through the signal lines 3. The signal detection circuit 105 converts the electrical signal flowing in each of the signal lines 3 into digital data. The control section 106 executes specific processing on the converted digital data. The control section 106 then performs interpolation processing on the image data that has been subjected to the specific processing, and generates an image representing the irradiated radiation.

According to the present exemplary embodiment, the electrical signals flow out through the radiation detection lines 120 independently of the switching state of the TFT switches 4 of the pixels 20B. Consequently, the present exemplary embodiment is capable of detecting radiation by sampling with the X-ray detection circuit 130 even in the OFF period in which an OFF signal is output by the scan signal control circuit 104 to each of the scan lines 101.

The radiographic imaging apparatus 100 according to the present exemplary embodiment detects radiation irradiation start and starts accumulation of charge in each of the pixels 20 of the radiographic imaging device 10. Consequently, the radiation irradiated in the duration up until radiation irradiation is detected, does not contribute to the radiographic image. However, in normal imaging the radiation irradiation duration is 100 ms or greater, and specific period 1H is about 100 μs. Consequently, substantially all of the irradiated radiation can be utilized, with hardly any loss.

In the present exemplary embodiment, the plural radiation detection pixels 20B are connected to the radiation detection lines 120. The present exemplary embodiment can thereby obtain plural multiples of charge compared to cases in which only one pixel 20B is connected. The present exemplary embodiment can thereby detect irradiation of radiation when the energy of radiation is still at a low stage, and transition to accumulation operation. Namely, the present exemplary embodiment is capable of reducing radiation loss. In particular, with X-rays, often the response characteristics are slow and high energy is not emitted during the first period of irradiation. Consequently, by connecting plural of the radiation detection pixels 20B to the radiation detection lines 120, the present exemplary embodiment raises the detection precision of X-ray irradiation start.

[Third Exemplary Embodiment]

Explanation now follows regarding a third exemplary embodiment. The configuration of a radiographic imaging device 10 according to the third exemplary embodiment is similar to that of the first exemplary embodiment (see FIG. 2 to FIG. 4). Also, the operation of the configuration of the radiographic imaging apparatus 100 according to the third exemplary embodiment and operation during radiographic imaging are also substantially similar to that of the second exemplary embodiment (see FIG. 9 and FIG. 10). Accordingly, further explanation thereof is omitted.

Figure 13:
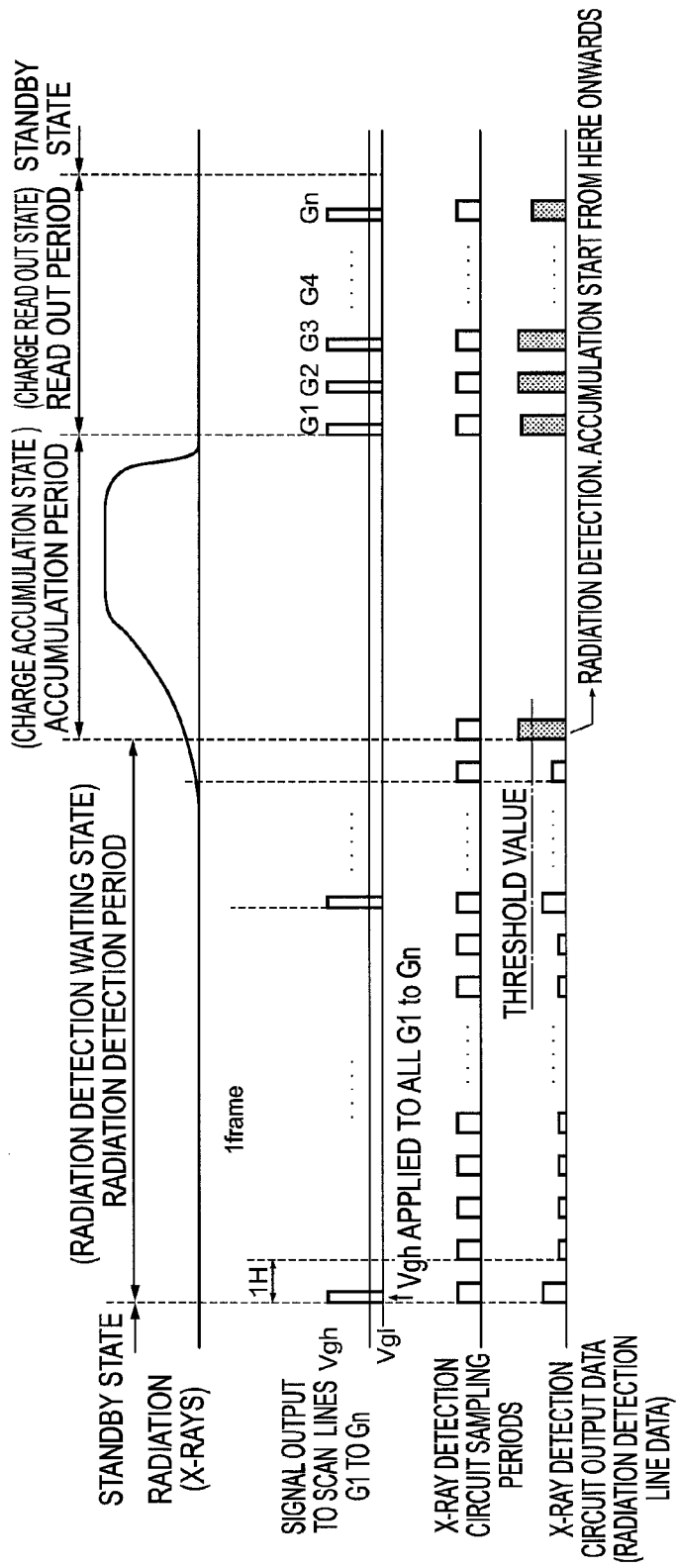
FIG. 13 is a time chart in which details are shown of operation of a radiographic imaging apparatus according to a third exemplary embodiment during radiographic imaging.

FIG. 13 shows a timing chart showing operation during radiographic imaging with the radiographic imaging apparatus 100 according to the third exemplary embodiment.

The control section 106 transitions to the radiation detection waiting state when notified to transition to imaging mode. Then, the control section 106 controls the scan signal control circuit 104 to output OFF signals from the scan signal control circuit 104 to each of the scan lines 101. The control section 106 also controls the X-ray detection circuit 130 such that repeated sampling is performed by the X-ray detection circuit 130 at a specific period 1H to detect for radiation by converting the electrical signals flowing in the radiation detection lines 120 into digital data.

However, when the radiation detection waiting state persists for a long time, charge accumulates in each of the pixels 20 due to dark current or the like. To address this, in the present exemplary embodiment, reset operation is performed by the control section 106 causing the scan signal control circuit 104 to periodically output an ON signal to all of the scan lines 101, read out the charge that has accumulated in each of the pixels 20 of the radiographic imaging device 10.

The control section 106 compares the value of the digital data converted by the X-ray detection circuit 130 with the predetermined specific threshold value for use in radiation notification. The control section 106 detects whether radiation has been irradiated by whether the comparison value is the threshold value or greater.

The control section 106 halts the reset operation when irradiation of radiation has been detected, and causes charge to be accumulated in each of the pixels 20A of the radiographic imaging device 10. After a specific accumulation duration has elapsed, the control section 106 controls the scan signal control circuit 104 such that an ON signal is output from the scan signal control circuit 104 each of the scan lines 101 in sequence one line at a time. As a result, the control section 106 applies an ON signal through the scan lines 101 in sequence to the gate electrodes 2 of the TFT switches 4. Each of the TFT switches 4 of the pixels 20A of the radiographic imaging device 10 is thereby switched ON in sequence, and an electrical signal corresponding to the charge amount that has accumulated in each of the pixel 20A flows out through the signal lines 3. The signal detection circuit 105 converts the electrical signals flowing out through each of the signal lines 3 into digital data. Then the control section 106 performs specific processing on the converted digital data, then performs processing to interpolate image data for the radiation detection pixels 20B and generates an image representing the irradiated radiation.

According to the present exemplary embodiment, the reset operation is performed even when in the radiation detection waiting state if the standby duration persists for a long time. Consequently, the present exemplary embodiment may suppress to a low level noise due to dark current or the like included in the electrical signals read from the radiographic imaging device 10.

[Fourth Exemplary Embodiment]

Explanation now follows regarding a fourth exemplary embodiment.

The configuration of a radiographic imaging device 10 according to the fourth exemplary embodiment is similar to that of the first exemplary embodiment (see FIG. 2 to FIG. 4). Also, the operation of the configuration of the radiographic imaging apparatus 100 according to the fourth exemplary embodiment and operation during radiographic imaging are also substantially similar to that of the second exemplary embodiment (see FIG. 9 and FIG. 10). Therefore, further explanation thereof is omitted.

Figure 14:
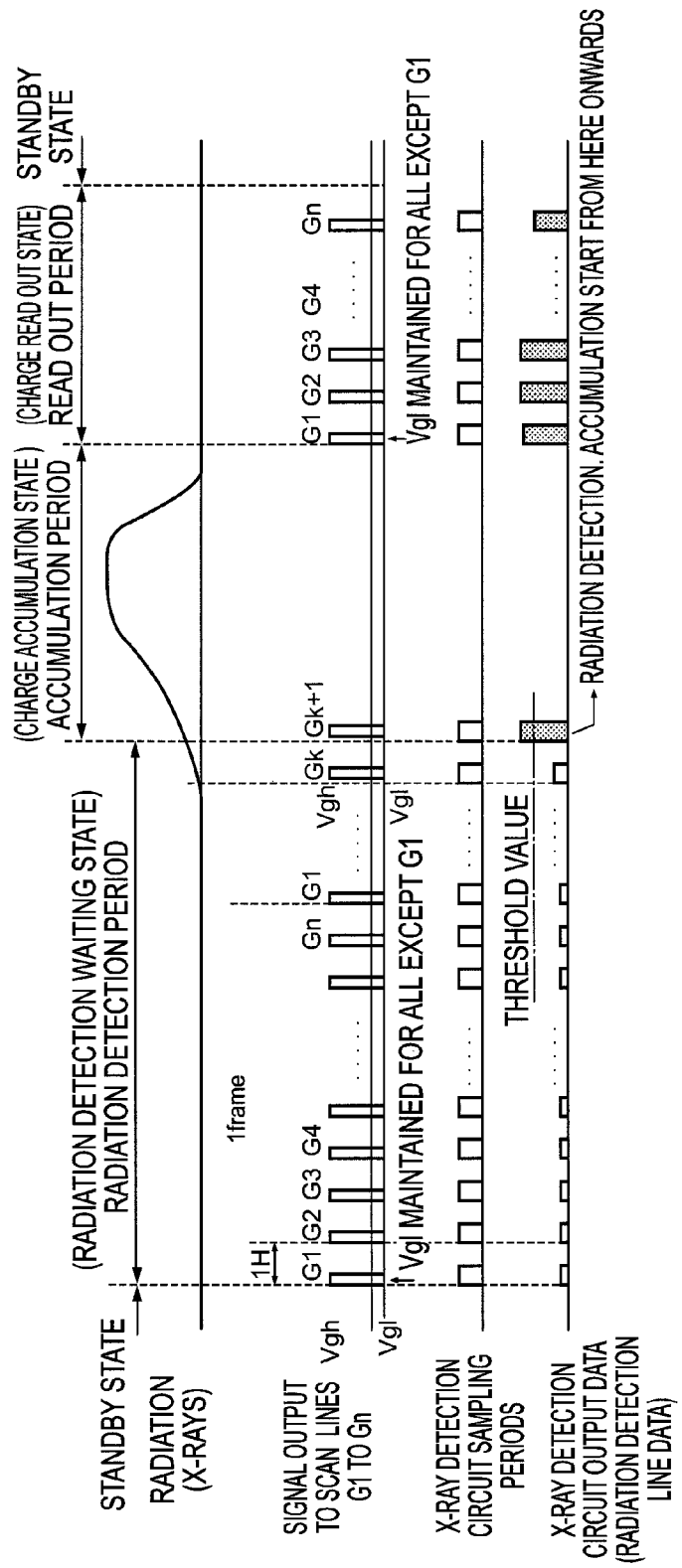
FIG. 14 is a time chart in which details are shown of operation of a radiographic imaging apparatus according to a fourth exemplary embodiment during radiographic imaging.

FIG. 14 shows a timing chart showing operation during radiographic imaging with the radiographic imaging apparatus 100 according to the fourth exemplary embodiment.

The control section 106 transitions to the radiation detection waiting state when notified to transition to imaging mode, then controls the scan signal control circuit 104 to output OFF signals from the scan signal control circuit 104 to each of the scan lines 101. The control section 106 also controls the X-ray detection circuit 130 such that repeated sampling is performed at a specific period 1H to detect for radiation by the X-ray detection circuit 130 converting the electrical signals flowing in the radiation detection lines 120 into digital data.

However, when the radiation detection waiting state persists for a long time, charge accumulates in each of the pixels 20 due to dark current or the like. To address this, in the present exemplary embodiment, the control section 106 controls the scan signal control circuit 104 to cause an ON signal to be output from the scan signal control circuit 104 to each of the scan lines 101 in sequence one line at a time. The control section 106 thereby switches the TFT switches 4 connected to each of the scan lines 101 ON in sequence one line at a time, and performs a reset operation to read out the charges that has accumulated in each of the pixels 20 of the radiographic imaging device 10.

The control section 106 compares the value of the digital data converted by the X-ray detection circuit 130 with the predetermined specific threshold value for use in radiation notification. The control section 106 detects whether radiation has been irradiated by whether the comparison value is the threshold value or greater.

The control section 106 halts the reset operation when irradiation of radiation has been detected, and causes charge to be accumulated in each of the pixels 20A of the radiographic imaging device 10. After a specific accumulation duration has elapsed, the control section 106 controls the scan signal control circuit 104 such that an ON signal is output from the scan signal control circuit 104 to each of the scan lines 101 in sequence one line at a time. As a result, the control section 106 applies an ON signal through the scan lines 101 in sequence to the gate electrodes 2 of the TFT switches 4. Each of the TFT switches 4 of the pixels 20A of the radiographic imaging device 10 is thereby switched ON in sequence, and an electrical signal corresponding to the charge amount that has accumulated in each of the pixel 20A flows out through the signal lines 3. The signal detection circuit 105 converts the electrical signal flowing out through each of the signal lines 3 into digital data. Then the control section 106 subjects the converted digital data to specific processing. The control section 106 also performs interpolation processing on the image data that has been subjected to the specific processing, to give the image data of each of the radiation detection pixels 20B and generates an image representing irradiated radiation.

According to the present exemplary embodiment, a similar reset operation is performed during the radiation detection waiting state as that of the standby state. Consequently, the present exemplary embodiment may acquire most recent data for use in offset correction. The offset for generating each of the pixels 20 of the radiographic imaging device 10 sometimes changes with the passage of time according to the state of the radiographic imaging device 10. Consequently, the present exemplary embodiment may reduce noise of the radiographic image by performing correction based on the most recent offset correction data.

According to the present exemplary embodiment, reset operation is halted at the point in time when radiation irradiation has been detected. Accordingly, sometimes a step is generated in the image by the line in the radiographic image at which reset operation was halted. However, in cases where the radiation at the radiation irradiation start point is low, since the proportion of radiation loss is small, it is possible to use the image as it is. In the present exemplary embodiment, configuration may be made such that any step is corrected when performing the interpolation processing from the image data of the line adjacent to the step.

FIG. 14 shows sampling of radiation at the specific period 1H. However, sampling of radiation may be performed with a periodicity that is shorter than the specific period 1H. By sampling radiation with a periodicity shorter than the specific period 1H, the duration until radiation irradiation detection may be shortened, and the radiation that does not contribute to the radiographic image may be reduced.

[Fifth Exemplary Embodiment]

Explanation now follows regarding a fifth exemplary embodiment.

The configuration of a radiographic imaging device 10 according to the fifth exemplary embodiment is similar to that of the first exemplary embodiment (see FIG. 2 to FIG. 4). Also, the operation of the configuration of the radiographic imaging apparatus 100 according to the fifth exemplary embodiment and operation during radiographic imaging are also substantially similar to that of the second exemplary embodiment (see FIG. 9 and FIG. 10). Accordingly, further explanation thereof is omitted.

Figure 15:
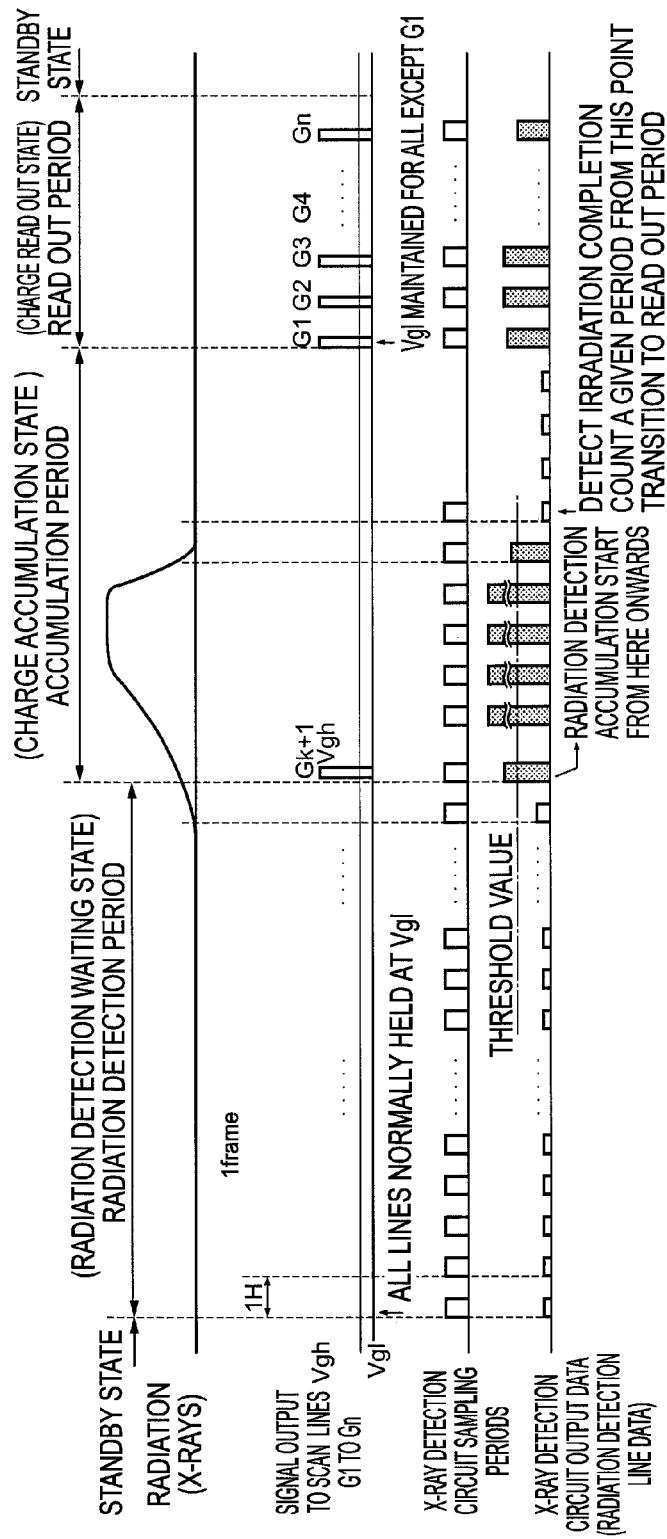
FIG. 15 is a time chart in which details are shown of operation of a radiographic imaging apparatus according to a fifth exemplary embodiment during radiographic imaging.

FIG. 15 shows a timing chart showing operation during radiographic imaging with the radiographic imaging apparatus 100 according to the fifth exemplary embodiment.

In the radiographic imaging apparatus 100 according to the fifth exemplary embodiment, similarly to in the first exemplary embodiment described above, the control section 106 controls the scan signal control circuit 104 such that an OFF signal (voltage Vgl signal) is output to each of the scan lines 101 from the scan signal control circuit 104. The control section 106 also controls the X-ray detection circuit 130 such that repeated sampling is performed at a specific period 1H to detect for radiation by the X-ray detection circuit 130 converting the electrical signals flowing in the radiation detection lines 120 into digital data.

Even after radiation irradiation has been detected, the control section 106 controls the X-ray detection circuit 130 such that repeated sampling is performed at a specific period 1H to detect for radiation by the X-ray detection circuit 130 converting the electrical signals flowing in the radiation detection lines 120 into digital data.

When radiation has finished being irradiated from the radiation generation device, the charge being generated in the pixels 20B reduces, and the level of the electrical signal flowing in the signal lines 3 decreases.

The control section 106 compares the value of the digital data converted by the X-ray detection circuit 130 with a predetermined specific threshold value for use in radiation notification. The control section 106 then performs detection of whether radiation irradiation is finished by determining whether the comparison value has become less than the threshold value.

When the control section 106 detects completion of irradiation of the radiation, after standing by for a specific completion state standby duration from the point at which this detection was made, the control section 106 controls the scan signal control circuit 104 and causes an ON signal to be output from the scan signal control circuit 104 to each of the scan lines 101 in sequence one line at a time. Then, the control section 106 applies an ON signal through the scan lines 101 in sequence to the gate electrodes 2 of the TFT switches 4 and reads out electrical signals corresponding to the charge amount that has accumulated in each of the pixel 20A of the radiographic imaging device 10. The control section 106 also generates an image representing the irradiated radiation from the electrical signals that have been read out. Note that configuration may be made such that the control section 106 controls the scan signal control circuit 104 at a timing immediately after radiation irradiation completion has been detected, and causes an ON signal to be output from the scan signal control circuit 104 to each of the scan lines 101 in sequence one line at a time.

Accordingly, the present exemplary embodiment performs sampling of the radiation detection lines 120 to which the pixels 20B are connected during the radiation irradiation period as well. The present exemplary embodiment can thereby detect the timing of radiation irradiation completion.

Appropriate combinations may be made of the detection of radiation irradiation amount of the first exemplary embodiment, the detection of irradiation start of the second to the fourth exemplary embodiments, and the detection of the irradiation completion of the above fifth exemplary embodiment.

In each of the above exemplary embodiments, explanation has been given of examples in which the there is a single radiation detection line 120 disposed for each of the pixel rows in the row direction (across direction) to the radiographic imaging device 10. However, configuration may be made in which there is a single radiation detection line 120 disposed for each N (wherein N is an integer of 2 or more) pixel rows in the row direction. Namely, configuration may be made in which a radiation detection line 120 is disposed at one line for each of a specific number (an integer of 1 or greater) of pixel rows in the row direction.

Figure 16:
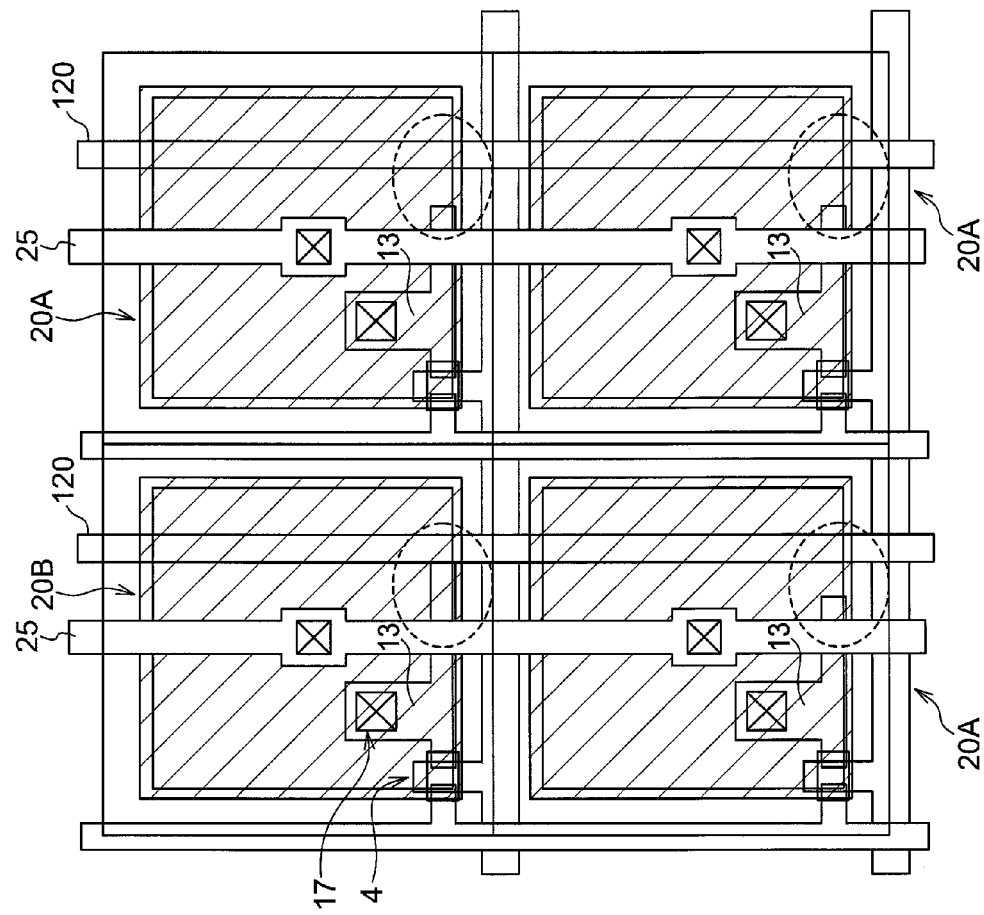
FIG. 16 is a diagram showing an example of which radiation detection lines are provided in a column direction (vertical direction) according to an alternative exemplary embodiment.

Configuration may also be made, as shown in FIG. 16, in which the radiation detection lines 120 are disposed in the column direction (vertical direction) in the second signal wiring layer, and pixels 20 for which the drain electrodes 13 of the second signal wiring layer are connected to the radiation detection lines 120 are employed as the radiation detection pixels 20B, and the pixels 20 for which the drain electrode 13 of the second signal wiring layer are not connected to the radiation detection lines 120 are employed as the radiographic imaging pixels 20A. By disposing the radiation detection lines 120 in this manner, an increase in the capacitance of the signal lines 3 (namely reduction in the signal-noise ratio) may be prevented. In the case shown in FIG. 16, two masks are employed when forming the pixels 20A and the pixels 20B. More specifically, one mask is employed when forming the pixels 20A and the other mask is employed when forming the pixels 20B.

Configuration may also be made such that the radiation detection lines 120 are disposed in the column direction (the vertical direction) in a different layer to the second signal wiring layer. Configuration may also be made such that the pixels 20 whose drain electrodes 13 in the second signal wiring layer are connected to the radiation detection lines 120 through contact holes are employed as the radiation detection pixels 20B, and the pixels 20 whose drain electrodes 13 in the second signal wiring layer are not connected to the radiation detection lines 120 are employed as the radiographic imaging pixels 20A.

Configuration may also be made such that when plural of the radiation detection lines 120 are disposed in the column direction, one of the radiation detection lines 120 is disposed in the column direction for every specific number (an integer of 1 or greater) of pixel rows in the column direction.

Figure 17:
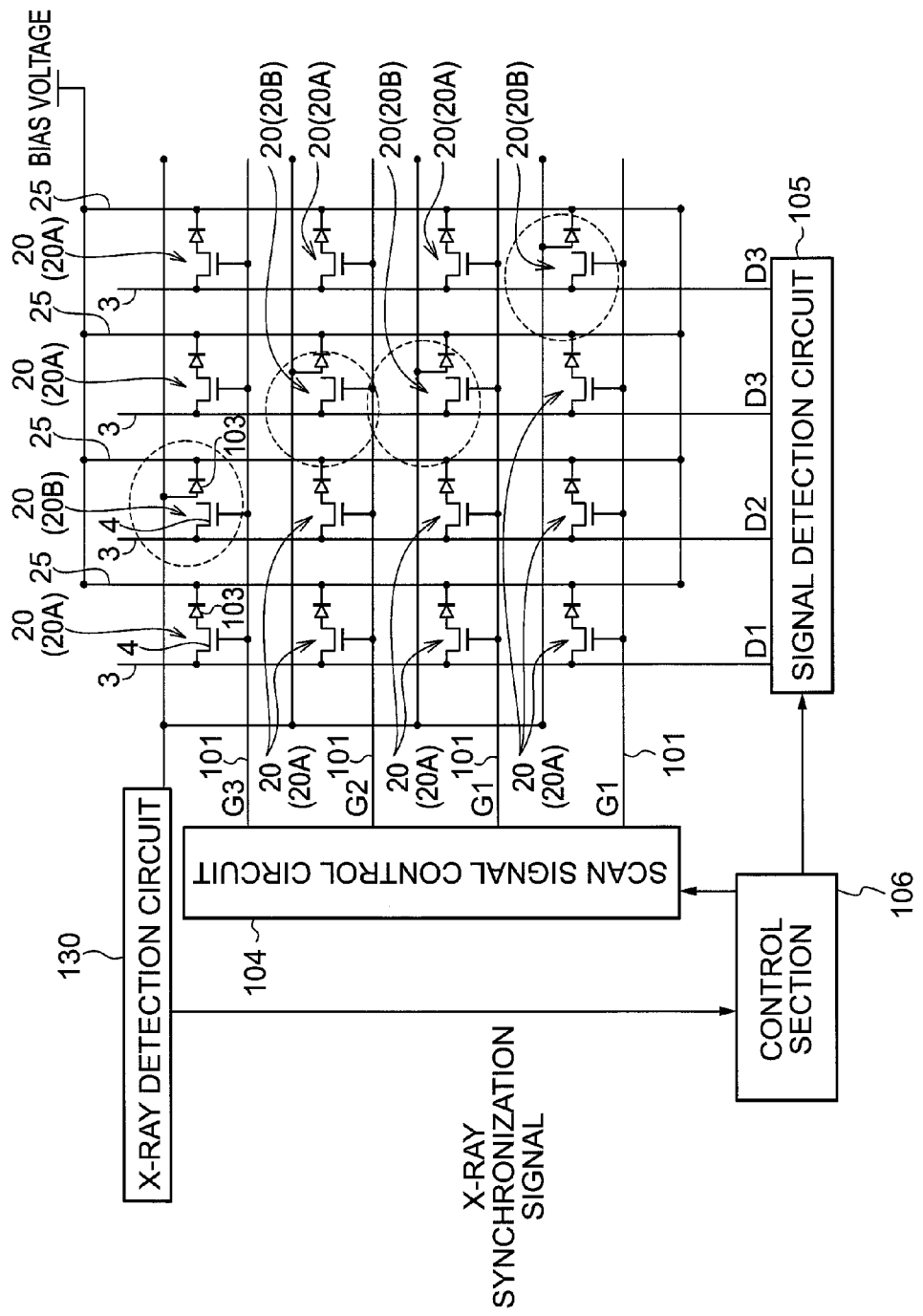
FIG. 17 is a plan view showing a configuration of a radiographic imaging device according to an alternative exemplary embodiment.

The radiographic imaging device 10 may also be configured as shown in FIG. 17, with the pixels 20B formed electrically separated from the sensor sections 103 and the TFT switches 4. Due thereto, electrical signals due to the charge generated in the sensor sections 103 of the pixels 20B may be prevented from flowing in the signal lines 3.

Explanation has been described above of a case in which an indirect-conversion-type radiographic imaging device is employed. However, the present invention can be applied to cases in which a direct-conversion-type is employed, wherein radiation is converted into charge in a semiconductor layer and accumulated. In such cases, the sensor sections in the direct conversion method generate charge due to irradiation with radiation.

The configuration of the radiographic imaging apparatus 100 and the configuration of the radiographic imaging device 10 explained in the above exemplary embodiments are also only examples thereof. Obviously appropriate modifications may be made thereto within a range not departing from the spirit of the present invention.

What is claimed is:

1. A radiographic imaging device comprising:
a plurality of pixels disposed in a matrix in a detection region for detecting radiation, each pixel comprising a sensor section that generates charges based on irradiation of radiation, or on illumination of light that has been converted from radiation, and a switch element connected to the sensor section, wherein the plurality of pixels includes a plurality of radiographic imaging pixels and a plurality of radiation detection pixels;
a plurality of scan lines, connected to each of the switch elements, through which a control signal flows for switching the switch elements in order to read out the charges that has been generated in the sensor sections of each pixel, out of the plurality of pixels;
a plurality of signal lines through which an electrical signal flows corresponding to the charges that has been accumulated in the sensor sections, and are connected to the sensor sections according to the switching state of the switch elements; and
a cumulative radiation accumulation detection circuit connected to a plurality of the radiation detection pixels of the plurality of pixels in matrix in the detection region.

2. The radiographic imaging device of claim 1, wherein the sensor sections of the radiation detection pixels are electrically separated from the signal lines.

3. The radiographic imaging device of claim 1, wherein the radiation detection pixels are separated with each other by one or more pixels.

4. The radiographic imaging device of claim 1, wherein:
each of the sensor sections is configured including an upper electrode, a photoelectric conversion layer, and a lower electrode; and
the radiation detection line is connected to the lower electrode of the sensor sections of the radiation detection pixel.

5. The radiographic imaging device of claim 1, further comprising:
a detection section that, based on the charges read out from the radiation detection pixels, detects at least one of, start of irradiation of the radiation, completion of the irradiation of the radiation, and an amount of irradiated radiation, wherein the detection section is connected to one or more radiation detection line.

6. The radiographic imaging device of claim 1, further comprising:
a radiation irradiation control unit that detects an amount of irradiated radiation and controls a radiation source for irradiating the radiation based on the irradiated amount, wherein the radiation detection line is connected to the radiation irradiation control unit.

7. The radiographic imaging device of claim 1, wherein the radiation detection line is connected to a connection node of the sensor sections and the switch elements of the radiation detection pixels, and the charges that have been generated in the sensor sections of the radiation detection pixels flow therein.

8. A radiographic imaging apparatus comprising:
the radiographic imaging device of claim 1; and
a detection section that, based on the electrical signal flowing in the radiation detection line, detects at least one of, start of irradiation of the radiation, completion of the irradiation of the radiation, and an amount of irradiated radiation.

9. The radiographic imaging apparatus of claim 8, further comprising:
a control signal output section that, when the detection section detects the start of the irradiation of the radiation, outputs a control signal to the plurality of scan lines;
a generation section that generates image data representing a radiographic image, based on the electrical signals flowing in the plurality of signal lines; and
a control section that, during standby controls the control signal output section to repeatedly perform a reset operation that outputs a control signal to the plurality of scan lines to extract charges and thereby extracts charge from the radiographic imaging pixels, and
during radiographic imaging, controls the control signal output section such that a control signal is output to the plurality of scan lines that halts extraction of charge when start of irradiation of the radiation has been detected by the detection section and outputs a control signal for performing extraction of charge to the plurality of scan lines after radiation irradiation has been completed.

10. The radiographic imaging apparatus of claim 9, wherein the control section controls the control signal output section during radiographic imaging to repeatedly perform the reset operation until the start of irradiation of the radiation has been detected.

11. The radiographic imaging apparatus of claim 9, wherein the control section controls the control signal output section during radiographic imaging to output a control signal to the plurality of scan lines for halting extraction of charge until the start of irradiation of the radiation has been detected.

12. The radiographic imaging apparatus of claim 9, wherein during the reset operation, the control signal output section outputs a control signal for performing extraction of charge either in sequence to the plurality of scan lines or at once to all of the plurality of scan lines.

13. The radiographic imaging apparatus of claim 9, wherein the generation section interpolates image data for the radiation detection pixels and generates image data representing a radiographic image.

\* \* \* \* \*